US012280005B2

(12) United States Patent
Zuniga et al.

(10) Patent No.: US 12,280,005 B2
(45) Date of Patent: Apr. 22, 2025

(54) AID ASSISTANCE DEVICES, WITH DATA-DRIVEN MONITORING AND RECORD-KEEPING

(71) Applicants: Glenda Zuniga, Oxnard, CA (US); Christopher Persaud, Winnetka, CA (US)

(72) Inventors: Glenda Zuniga, Oxnard, CA (US); Christopher Persaud, Winnetka, CA (US)

(*) Notice: Subject to any disclaimer, the term of this patent is extended or adjusted under 35 U.S.C. 154(b) by 180 days.

(21) Appl. No.: 18/135,090

(22) Filed: Apr. 14, 2023

(65) Prior Publication Data

US 2024/0342040 A1 Oct. 17, 2024

(51) Int. Cl.
*A61H 3/04* (2006.01)
*A61H 3/00* (2006.01)

(52) U.S. Cl.
CPC ......... *A61H 3/04* (2013.01); *A61H 2003/002* (2013.01)

(58) Field of Classification Search
CPC ............................................... A61H 2003/002
See application file for complete search history.

(56) References Cited

U.S. PATENT DOCUMENTS 4,907,839 A 3/1990 Rose et al.
5,219,139 A * 6/1993 Hertzler .................. A61G 5/10 248/276.1
5,281,182 A * 1/1994 Yoneda .................. A63H 30/04 124/78
5,918,892 A * 7/1999 Aaron .................. F16B 7/0433 280/47.38
7,422,550 B1 9/2008 Pinero et al.
9,351,901 B1 5/2016 Petsch
10,596,061 B2 * 3/2020 Chamberlain ........... A61G 5/10
10,786,407 B2 * 9/2020 Ellis ......................... B60D 1/52
11,220,281 B2 * 1/2022 Bar-Or .................. B62B 5/0016
11,439,743 B2 * 9/2022 Johnson .................. B62B 3/025
2017/0172462 A1 * 6/2017 Alghazi .................. A45B 3/00
2018/0104133 A1 * 4/2018 Chen ...................... A61H 3/008
2019/0143534 A1 * 5/2019 Watanabe ............ B25J 15/0226 294/116

FOREIGN PATENT DOCUMENTS

KR 101146112 B1 5/2012

* cited by examiner

*Primary Examiner* — Noah Chandler Hawk

(57) ABSTRACT

The invention includes apparatus for holding medical equipment such as poles holding intravenous bags in a set position, relative to other medical equipment such as walkers, so that the user can move and walk more easily and use all the equipment while the user is moving. The user can, for example, use the invention to hold an intravenous bag pole to a walker and use both at the same time. The invention can also help with physical therapy, with nursing home patients, and with helping patient recovery in general. The invention also includes multiple methods for capturing data created by the apparatus and using the data to improve users' physical therapy. Some of the methods use non-fungible tokens to keep data about the use of the apparatus.

20 Claims, 26 Drawing Sheets

AID ASSISTANCE DEVICES, WITH DATA-DRIVEN MONITORING AND RECORD-KEEPING

DESCRIPTION OF THE PRIOR ART

Hospital patients, nursing home patients, physical therapy patients, and others, often have mobility difficulties and need to use walkers, wheelchairs, or other mobility aids. Patients also may sometimes need other equipment, such as poles to hold intravenous bags (Hereafter called "intravenous poles" for short). An intravenous pole generally has wheels. A patient, while moving, may need to have multiple pieces of equipment move with them. For example, a physical therapy patient, or a patient of another kind, may need to use a walker to move, and also have an intravenous pole move with the patient so that the patient can keep receiving the substances contained in the intravenous bag. In the prior art, a patient who uses both a walker and an intravenous pole will need both hands to move the walker. The patient therefore will not be able to move the intravenous pole, while moving the walker. The patient will have to rely on nurses and other medical personnel to move the intravenous pole, or the patient will not be able to walk. If nurses or other health care personnel are helping to move a patient's intravenous pole, they are not available for other things. This increases health care costs. Patients will be dependent on nurses and other medical personnel to exercise, walk around, and reach the bathroom. Patients also will not be able to exercise, walk around, and do things like use the bathroom as much as they would be able to do if the walker and intravenous pole could be easily moved at the same time.

A physical therapist may also find that the therapist is more able to give therapy services to patients if the patients can move multiple pieces of equipment by holding and moving one of them. A patient may be capable of more, and longer, physical therapy sessions if the patient can move an intravenous pole easily by moving another piece of equipment, like a tray cart or a walker.

However, nobody has previously created a portable gripping device that can be used to connect two or more pieces of equipment together easily, so that the user can move one piece of equipment by moving another piece of equipment. Such an invention is needed, and it should preferably minimize how much an intravenous pole or a walker will shake when a patient is moving both of them together. The present invention includes a series of gripping mechanisms that can be used to grip one piece of medical equipment and hold it to another, for example, by gripping a walker and holding it to an intravenous pole.

This invention will increase mobility for patients, and make it easier for patients to exercise and engage in physical therapy. This, in turn, should improve outcomes for patient treatment, and increase quality of life for patients, nursing home residents, and disabled people.

Further developments of the invention also include the ability to activate the gripping device remotely, which might be more convenient for some users. A user can also keep track of the gripping device's movements and identified use information about the gripping device's movements to learn other things. For example, the user might learn about whether the user has been able to do as much exercise as the user desires. The user, or the user's physical therapist, might also learn whether the amount of movement the user makes has been slowly increasing or decreasing. This might be important for planning patient care in other ways.

The prior art does not include anything similar to the present invention, or any of its variations.

Petsch, at FIG. 4, does mention a type of clamp, but Petsch's clamp is structurally different from the grippers in the embodiments of the present invention, and also does not use Velcro.

The inventors' education at California State University, Los Angeles, California State University, Northridge, University of Miami, Ave Maria Law School, and New York University helped them to design some of the embodiments of the present invention.

SUMMARY OF THE INVENTION

The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

As used herein and in the appended claims, the singular forms "a," "an," and "the" include plural references unless the context clearly dictates otherwise.

As one skilled in the art will appreciate, any of the software modules described below may be combined into a single software module for performing the operations described herein. Likewise, the software modules can be distributed across any combination of the computing systems and devices described herein, and are not limited to the express arrangements described herein. Accordingly, any of the operations described herein can be performed by any of the computing devices or systems described herein, unless expressly noted otherwise.

The below-detailed description has set forth various embodiments of the devices and/or processes of the invention via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, some portions of the subject matter described herein may be implemented via Application Specific Integrated Circuits (ASICs).

However, those skilled in the art will recognize that designing the circuitry and/or writing the code for the software and or firmware would be well within the skill of one skilled in the art in light of this disclosure.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components.

Likewise, any two components so associated can also be viewed as being "operably connected," or "operably coupled," to each other to achieve the desired functionality, and any two components capable of being so associated can also be viewed as being "operably couplable" to each other to achieve the desired functionality.

From the foregoing and the other information discussed below, it will be appreciated that various embodiments of the present disclosure are described herein for purposes of illustration, and that various modifications may be made without departing from the scope and spirit of the present disclosure. Accordingly, the various embodiments disclosed herein are not intended to be limiting.

The "gripping apparatus" is the part of the invention that actually grips other items that are not a part of the invention. For example, the gripping apparatus grips items such as the walker or intravenous pole.

The "gripping apparatus" is the central rod, first gripper, second gripper, and everything attached to them.

This patent is dedicated to Jose Arturo Zuniga, father of one of the inventors herein. That inventor would like to thank Mr. Zuniga for allowing her to dream big and teaching her to dream big.

TERM NUMBERS

Central beam (1). First gripper (2). Second gripper (3). Hard first gripper (4). Hard second gripper (5). Cross-beam (6). Subsidiary first gripper (7). Subsidiary second gripper (8). Individual user database (9). Non-fungible token (10). Remote control (11). Battery (12). Transmitter (13). Magnet (14). Electromagnet (15). Receiver (16). Angular gripper (17). Subsidiary beam (18). Combined patient database (19). Control panel (20). Vertical beam (21). Movement sensor (22). Mobile program (23). Central Program (24). Individual gripping apparatus database (25). Outer side (26). Inner side (27). Movement indicator (28). Remote control gripper (29). Suction cup (30). Combined gripping apparatus database (31).

A gripping apparatus, for this application's purposes, is the central rod, first gripper, second gripper, and everything attached to them.

Velcro is part of the class of hook-and-loop fasteners. Many of the embodiments discussed below will use Velcro, but other hook-and-loop fasteners can also be used in place of Velcro. In a hook-and-loop fastener, there are two surfaces. One surface features tiny hooks, and the other features smaller loops. It will be understood that in the embodiments discussed below, where Velcro is used, there will be at least one surface with hooks and one surface with loops, unless otherwise specified.

The First Embodiments

In the first embodiment of the invention, the outer side (26) of a first gripper (2) is attached to one end of a central rod (1), and the outer side (26) of a second gripper (3) is attached to the other end of the central rod. The first gripper and second gripper are made of flexible, but strong, material. The first gripper has at least two Velcro patches on its inner side (27), one with hooks and the other with loops, and the first gripper can be folded so that it surrounds an object in a way that allows the Velcro patches to contact each other and bind to each other. The second gripper also has at least two Velcro patches on its inner side (27), one with hooks and the other with loops, and the second gripper can be folded so that it surrounds an object in a way that allows the Velcro patches to contact each other and bind to each other.

A user can then use the first gripper to surround an intravenous pole, and bind the Velcro patches on the first gripper to each other, while using the second gripper to surround a leg of a walker, while binding the Velcro patches on the second gripper to each other. Then, the user can move the walker, and the intravenous pole will be pulled with the walker. The user can also move the intravenous pole, and the walker will be pulled with the intravenous pole. The user, in this situation, should wrap the first gripper and second gripper tightly enough around the intravenous pole and walker, respectively, that the intravenous pole will not shake when the user is using the walker and a connected gripping apparatus to pull the intravenous pole, and/or that the walker will not shake when the user is using the intravenous pole and a connected gripping apparatus to pull the walker.

In some versions, a portion of each gripper starting at the part of that gripper closest to the center of the central rod will be attached to the central rod. In other versions, the central rod will be attached to one point on each gripper.

Other Velcro Patterns on the Grippers

The Velcro on the first gripper and second gripper can be designed in numerous patterns, besides two patches of Velcro on the inner side (27) of the first gripper and two more patches of Velcro on the inner side (27) of the second gripper. For example, Velcro patches can be placed on the outer sides (26) of the first and/or second grippers, in addition to, or instead of, Velcro patches on the inner sides (27) of the first and second grippers. The outer side (26) and/or the inner side (27) of the first and/or second gripper can also each include multiple Velcro patches, so that a user can decide which of the "hooked" patches the user wants to connect to which of the "looped" patches on each gripper. This arrangement might also make the gripping apparatus more flexible so that it can be used with objects and equipment with poles of different sizes. For example, this arrangement might make the grippers more flexible in gripping intravenous poles of different diameters.

Any Velcro patches on the inner side (27) and outer side (26) of each gripper can also be of different shapes and/or sizes from those in the first embodiment.

Some embodiments will include a first Velcro patch with hooks, and a first Velcro patch with loops, next to each other on a gripper, and a "corresponding" second Velcro patch with loops, and second Velcro patch with hooks, respectively, next to each other on a different part of the same gripper. The first Velcro patch with hooks is meant to attach to the second Velcro patch with loops, and the first Velcro patch with loops is meant to attach to the second Velcro patch with hooks.

All other configurations of the Velcro patches known in the prior art are explicitly part of the present invention.

Other Components That Can Open and Close the Grippers

All methods in the prior art of securing one of the grippers around an object such as a walker or intravenous pole, and then loosening that gripper when it needs to be taken away from the walker or intravenous pole, are explicitly contemplated by the present invention. All components in the prior art of securing one of the grippers around an object such as a walker or intravenous pole, and then loosening that gripper when it needs to be taken away from the walker or intravenous pole, are also explicitly contemplated by the present invention. Mechanical methods of attachment, and mechanical components for securing the grippers, in particular, would be explicitly contemplated by the present invention.

The present invention can use Velcro as a method of attachment on the first gripper and a different method of attachment for the second gripper, or vice versa. The present invention can also theoretically use one method of attachment for one gripper, and a second method of attachment for another gripper, where neither method of attachment is Velcro.

Here, a "manual hook" is a hook that is not part of a hook-and-loop fastener. A "manual loop" is a loop that is not part of a hook-and-loop fastener.

Some of the additional attachment methods that can be used for the first and second grippers include:

First, embodiments that use another hook-and-loop fastener in place of Velcro.

Some other embodiments of the invention involve grippers made out of a hard substance, such as metal or plastic.

A second additional attachment method involves designing the first gripper or second gripper with adhesives, so that the user can close the first gripper or second gripper, respectively, by pressing a part of the first gripper or second gripper, respectively, with an adhesive onto another part of that gripper. The user can then open that gripper later by applying pressure.

A third method involves designing different parts of a gripper (The first gripper, second gripper, or both) so that the parts of that gripper can interlock with each other around a pole. For example, the parts of a gripper can interlock when the user presses a part of that gripper. The parts of the gripper can also stop interlocking when the user moves or presses a part of that gripper.

A fourth method involves, designing different parts of a gripper (The first gripper, second gripper, or both) so that those parts of the gripper interlock with each other when another piece, such as a screw or a plastic piece similar to the screw, is added.

A fifth method involves, including manual hooks in a gripper, and also including manual loops, so that a user can manually place one or more of the manual hooks in one or more of the manual loops.

A sixth method involves, designing the parts of a gripper so that the parts of the gripper can be held together by friction, once the user puts the parts of the gripper together around an intravenous pole or other piece of medical equipment.

A seventh method involves, designing the parts of a gripper with a lock, so that these parts of the gripper can be locked together, and locked in place after the gripper surrounds an intravenous pole. A combination lock is one kind of lock that can be used for this purpose.

An eighth method involves, designing the parts of a gripper so that these parts of the gripper are held together by "snap-fits" when the gripper is placed around an intravenous pole or other piece of medical equipment.

A ninth method involves, designing the parts of a gripper so that they have threads, which can be used to hold the gripper in place when the gripper is placed around an intravenous pole or other piece of medical equipment.

A tenth method involves, using flexible joint(s) or hinge(s) on one or more of the grippers, so that that gripper can open or close on the hinge(s) or joint(s).

An eleventh method involves using a button on either the outer side or inner side of a gripper and having one or more attachment points for the button in places on the gripper, so that the gripper can be looped around or placed around an intravenous pole or other piece of medical equipment.

Many of these methods can be used with a battery connected to the grippers, or a battery connected to a motor that powers one or more of the grippers. For example, the third, fourth, sixth, seventh, and tenth methods can also use a battery connected to a motor that opens or closes each gripper when needed. Some grippers can include magnets and adhesives, in the same gripper. The magnets and adhesives can both hold the gripper closed when desired, and can reinforce each other.

These methods can potentially be used in combination, for example, a gripper can include adhesives and also include one or more manual hooks, which the user can hook into specially designed cavities in the gripper. A gripper can also include Velcro or another hook-and-loop fastener and also include one or more manual hooks, which the user can hook into specially designed cavities in the gripper to reinforce the effect of the Velcro.

The first through tenth additional attachment methods listed above can also be used, either individually or in combination, in grippers that are made out of a hard substance, such as plastic or metal.

A gripper can also use a soft inner portion, that surrounds the pole or other piece of medical equipment when it is used, and a hard outer portion that surrounds the inner portion.

Subsidiary and Angular Grippers

It is also possible to add more grippers, if needed, to embodiments of the invention, to grip more pieces of equipment and move them in unison.

For this application's purposes, a subsidiary gripper is a gripper which, when the first and second grippers are placed level with the ground, is above either the first or second gripper, or both. Some subsidiary grippers will be subsidiary first grippers (7) or subsidiary second grippers (8). Subsidiary grippers are connected to a subsidiary beam (18) which is connected to a vertical beam (21). The vertical beam (21) is connected to the central beam (1).

For this application's purposes, an angular gripper is a gripper that is not the first gripper or second gripper, or a subsidiary gripper. An angular gripper will be attached to a cross-beam (6), which will be attached to the central beam (1).

Subsidiary grippers and angular grippers can also be constructed using any of the components and methods discussed above for the first gripper or second gripper. These methods can also be used in combination, as they could be used when constructing a first gripper or second gripper.

Use of Remote Controls

In some embodiments, a user can remotely control whether, and when, each of the grippers will open, close, and stay open or closed. The user can therefore control whether each gripper continues gripping, or releases, a piece of equipment, such as an intravenous pole.

The remote control can be a simple button, operatively connected to a transmitter (13), where the user can reach and press the button if needed. When the button is pressed in this version, the button would send a command to the transmitter, which would broadcast the command to all the grippers with which it is communicating. The command would tell the grippers in communication with the transmitter to stop doing what they are doing; To close if they are currently open, and to open if they are currently closed.

For the remote control to be most effective, any gripper to which the remote control transmits must include or be connected to some physical apparatus that can open or close that gripper when a command for that gripper to open or close, respectively, is received. Two examples of such apparatus are electromagnets in the grippers and motors in or attached to the grippers. Electromagnets in a gripper can be activated when the gripper receives a command to close, and de-activated when the gripper receives a command to open. A motor in or near a gripper can also cause that gripper to close when the gripper receives a command to close, or open when the gripper receives a command to open.

More complex versions of the remote control can also be built, and a version of the remote control can be built that commands each of the grippers in a gripping apparatus individually, no matter what kind of gripper it is, as long as some method of opening and closing that gripper in response to a signal from the remote control is part of the version of the invention that includes that remote control. For example, a remote control which commands the first gripper individually and commands the second gripper individually can be built.

It would be helpful for a remote control controlling a gripping apparatus to have input features (features that allow the user to input information) that allow the user to decide which gripper the user wants to control, such as a separate button for each gripper, with the remote control configured so that the user can control each gripper by pressing a button specifically designated for that gripper, after which the transmitter in the remote control will broadcast a command to the receiver where the command is configured differently depending on which button is pressed. It would also be helpful for a remote control controlling a gripping apparatus to include the capability to use the remote control's input features to specify whether each gripper should be open or closed; One way to do this is to have two buttons on the remote for each gripper, one for "open", and one for "closed", where, when the user presses each button, the transmitter in the remote control will broadcast a command to the receiver where the command is configured differently depending on which button is pressed.

As an example, for a gripping apparatus with a first gripper, a second gripper, and two angular grippers, a remote control can be built with four groups of buttons, with two buttons in each group. The groups of buttons command the first gripper, second gripper, and two angular grippers, respectively, to each open or close, with one button in each group for "open", and the other for "close".

In some embodiments of the invention, the transmitter (13) in the remote control (11) wirelessly transmits to a receiver (16) on the gripping apparatus. The receiver (16) operatively connects to some or all of the grippers, including the first gripper (2), second gripper (3) and any subsidiary grippers or angular grippers that are part of the gripping apparatus. The receiver (16) transmits the commands it receives to the grippers. The receiver can be designed to only send the commands the user directed to a certain gripper to that gripper. The grippers can also be designed so that each gripper recognizes commands directed to that gripper, and acts on these commands but does not recognize commands directed to other grippers.

In some versions, the remote control could include adhesive, and be stuck to another item like the user's bed, or include a gripper itself to grip onto equipment such as the edge of a hospital bed.

The remote control can also take another form. For example, it can include one or more sensors over which the user can move a finger. When the user moves the finger over the sensor, the remote control transmits to the receiver a command to close or open (as desired) one or more of the grippers.

The invention explicitly contemplates any device in the prior art that fulfills the functions of the remote control, and any remote control device in the prior art.

A remote control can also be designed that can control the first gripper, and second gripper in a gripping apparatus, where the remote control also controls any subsidiary grippers and angular grippers in the same gripping apparatus. One way of designing such a remote control is to include a different input feature for each gripper, such as a different button on the remote control for each gripper, or two buttons, one for "opening" and one for "closing" each of the grippers.

The remote control can also be used in embodiments where the receiver on the gripping apparatus connects to batteries that power that receiver.

The remote control can also be used in embodiments where the gripping apparatus includes one or more batteries (12) to power the grippers, so that the grippers can open or close. The remote control can be used in embodiments where the gripping apparatus includes one or more batteries (12) that power motors that open or close one or more of the grippers.

In some embodiments the remote control and one or more grippers may be designed so that the user can choose how much to close one of these grippers. For example, the remote control can be designed so that when a user presses the "close" button for one of the grippers, the gripper can close gradually, and stop closing if the user stops pressing the "close" button for that gripper.

All methods for achieving this effect in the prior art can also be used.

The Movement Sensor

The movement sensor is present in some embodiments of the invention. It is placed in the gripping apparatus, is a part of the gripping apparatus, and it monitors whether, and when, the gripping apparatus moves. The purpose of the movement sensor is to monitor the amount that the gripping apparatus is moving in a defined time period (Such as a day, week month, or the length of time since the movement sensor was installed on that gripping apparatus), so that the amount of time that the gripping apparatus is being used can be monitored. Benefits of monitoring the amount of time that the gripping apparatus is being used include monitoring the amount of time that the patient using that gripping apparatus is moving. If the patient moves more, that can be a good indication for the patient's health or recovery. If the patient moves less, that can be an indication of problems, such as the patient not recovering on the expected schedule. It can also be an indication, in some cases, that the patient is not doing prescribed physical therapy.

All types of movement sensors in the prior art can fulfill the purpose of the movement sensor.

In some embodiments, the movement sensor may draw power from the battery (12).

The Movement Indicator

The movement indicator, in some embodiments of the invention, is a component, on a gripping apparatus, that shows how much one or more of the grippers has been closed, either in a certain defined period of time, or in the total period of time since that gripping apparatus was manufactured. The movement indicator can be used to quickly, roughly, find out how much a gripping apparatus has been used in a period of time, which may show how much a patient using that gripping apparatus has walked around or exercised during that time period.

Information about when grippers in a gripping apparatus are opened or closed, and about when the gripping apparatus moves, will be hereafter called "use information". A gripping apparatus is most likely being used when one of its grippers is opened, or closes, or when the gripping apparatus moves.

The movement indicator can be connected to the movement sensor, so that as the movement sensor monitors the movement of the gripping apparatus of which it is a part, the movement sensor sends use information to the movement indicator. In some embodiments, the movement indicator will change color as it receives more use information, from the movement sensor saying that the gripping apparatus has moved in a time period. Therefore, a caregiver will be able to quickly determine how much the gripping apparatus (And, by inference, the user, because the user will use the gripping apparatus to move equipment while the user is moving), has moved during that time period. In some embodiments, the movement indicator will display a numerical indication of the amount that the gripping apparatus has moved in a specified time period, such as the amount that the gripping apparatus has moved in a day, or 24-hour period. The indication can be in the form of a display of number of feet moved, number of meters moved, or use some other distance measure.

All methods of constructing the movement indicator in the prior art can be used in the present invention.

In some embodiments, the movement indicator may draw power from a battery which is part of the gripping apparatus.

The Mobile Program

Some embodiments of the invention will include an “app”, or computer program, that can be loaded onto a smart phone, desktop, laptop, smartwatch, or other computing device belonging to a patient, physician, or therapist. Hereafter, smart phones, desktops, laptops, smartwatches, and other computing devices will be called simply “computing devices”. The app, which is the mobile program (23) can include the capability to use the computing device’s wireless broadcasting capability to communicate with receivers on the gripping apparatus, telling components of the gripping apparatus to open or close. Thus, when desired, the gripper(s) provide a firm grip around a first piece of equipment, so that this first piece of equipment can be moved when the patient moves a second piece of equipment, to which the gripper(s) are also connected. For example, in one embodiment, if the mobile program (23) is on a patient’s cellular phone, the mobile program (23) can use the cellular phone’s wireless broadcasting capability to communicate with a receiver on the gripping apparatus, telling that receiver to send a signal to electromagnets, causing those electromagnets (15) to activate, where those electromagnets are part of either the first gripper (2) or second gripper (3), or both, in the gripping apparatus, so that the first gripper and/or second gripper, respectively, will close when the user desires.

In other embodiments where the grippers to which the mobile program transmits each include or are connected to some physical apparatus that can open or close that gripper when a command for that gripper to open or close, respectively, is received, the mobile program (23) on the user’s computing device will, when the user desires, use the cellular phone’s wireless broadcasting capability to send a signal to a receiver on the gripping apparatus, saying that one or more of the grippers in the gripping apparatus should open or close. The receiver will then send a signal to the appropriate gripper on the gripping apparatus, causing that gripper to open or close using whatever physical apparatus that gripper is connected to or includes that can open or close that gripper.

It is important to note that herein, when information is described as being broadcast, and then carried using the internet to another point or component of the invention, it is expected that this information, after being broadcast, will be received by local wireless networks, routers, etc. that connect to the internet, and then the information will be sent over the internet until it reaches the component or location that it is described as reaching.

When use information is collected and/or is broadcast, care must be taken to make sure that users’ private medical information is appropriately protected. Users’ private medical information can be protected using some of the methods discussed herein. Users’ private medical information can also be protected using other methods known in the prior art. The use of all such methods to protect users’ private medical information is explicitly part of the present invention.

Some versions of the mobile program can include a module (The movement indicator module) that fulfills the same goals as the movement indicator. In embodiments of the invention where a transmitter (13) is present in the gripping apparatus, the transmitter in the gripping apparatus can be programmed with a unique identifier for that individual gripping apparatus, such as a serial number. The transmitter in the gripping apparatus can then broadcast use information (preferably including the unique identifier or another way of defining which gripping apparatus is broadcasting the use information), which will be received by nearby computing devices that are running the mobile program. Then, the movement indicator module in one of the mobile programs, running on a nearby computing device, will display an indicator of the amount that that gripping apparatus has moved, or how much one or more of the grippers on that gripping apparatus has opened and/or closed.

Hereafter, use information that identifies the unique gripping apparatus to which the use information pertains shall be called “identified use information”.

In some embodiments, when the Central Program (24) receives identified use information, the central program (24) saves the identified use information sent by each individual gripping apparatus to an individual gripping apparatus database (25) which records when the grippers on that individual gripping apparatus, were opened and/or closed, and/or when that individual gripping apparatus moved. The use information broadcast by the transmitters in gripping apparatuses and received by the Central Program (24) can also be saved in a combined gripping apparatus database (31) which includes information about the use of as many gripping apparatuses as possible. Note that information about which patient was using each of the gripping apparatuses, and other medical information about the patients, could not be readily discerned from identified use information about when the grippers on individual gripping apparatuses, were opened and/or closed, and/or when that individual gripping apparatus moved, so use information without identifying information for the user using each gripping apparatus would probably not be subject to patient confidentiality requirements.

In some embodiments, the mobile program will include a capability for the user to enter a unique identifier, (such as a serial number), of a gripping apparatus, that the user intends to use, into the mobile program (23). The unique identifier for the gripping apparatus can then be associated with a unique identifier for the user. Hereafter, the user whose unique identifier is associated with the gripping apparatus’ unique identifier will be called an “associated user” of that gripping apparatus, and the gripping apparatus will be called an “associated gripping apparatus” of that user.

Then, the identified use information broadcasted thereafter by the transmitter (13) attached to that particular associated gripping apparatus can be added to the individual user database (9) for the associated user, and the individual user database (9) and movement indicator module in the mobile program (23) being used by the associated user will both include the identified use information broadcast by the transmitter (13) attached to that associated gripping apparatus.

Different embodiments of the invention include multiple ways, that the identified use information broadcast by the transmitter attached to the associated gripping apparatus can be added to the individual user database (9) for an associated user, and be accessible to the movement indicator module in the mobile program (23) being used by the associated user.

One such way is that the identified use information broadcast by the transmitter attached to the associated gripping apparatus can be received directly by the associated user's computing device using the computing device's wireless receiving capability, and then the mobile program (23) on the associated user's computing device will directly use its own movement indicator module to provide a visual depiction of the identified use information the computing device has received from the transmitter attached to the associated gripping apparatus. This indication can have many forms, such as a bar that is displayed on the computing device's screen, with different colors for the bar representing different amounts of movement of the associated gripping apparatus during a certain defined time period. This indication can also be a number, displayed on the computing device's screen, where the number represents the number of feet, meters, or number of some other distance unit, that the particular associated gripping apparatus has moved during a defined time period (such as the last day, last week, etc.). The computing device can also re-broadcast the identified use information it receives, to ensure that this identified use information is transmitted over the internet until it reaches the central program (24), which integrates the identified use information into the individual user database (9) for the associated user. The individual user database (9) for the associated user is available over the internet to the associated user's mobile program (23) and information from this individual database (9) can be displayed by the mobile program (23) for the associated user.

A second way is that the identified use information that the transmitter attached to the associated gripping apparatus broadcasts is carried, using the internet, until this identified use information reaches the central program (24), which will then integrate this identified use information into the individual user database (9) for the associated user. The central program (24) will also broadcast the identified use information over the internet so that the identified use information is available to the mobile program (23) of the associated user of that gripping apparatus, and the identified use information generated by the associated gripping device can be used by the movement indicator module of the mobile program (23) of the associated user to generate a visual indication of when the grippers in that associated gripping apparatus have been opened and/or closed, and how much and when that gripping apparatus has moved, during a certain time period. The visual indication can take any of the forms discussed herein.

In some embodiments, identified use information from gripping apparatuses associated with users that is received by the central program (24) will also be integrated, by the central program (24), into the combined patient database (19) so that researchers can try to find patterns in the use information related to multiple patients and multiple gripping apparatuses. Any of the methods in the prior art, including those discussed herein, for ensuring that the information reaches from the transmitters in the gripping apparatuses to the central program, can be used.

In some embodiments, the central program will integrate all use information, or all identified use information from gripping apparatuses received by the central program into the combined gripping apparatus database (31) and the central program will also integrate the identified use information it receives from each gripping apparatus into an individual gripping apparatus database (25) for that gripping apparatus. Any of the methods in the prior art, including those discussed herein, for ensuring that the information reaches from the transmitters in the gripping apparatuses to the central program, can be used.

The combined gripping apparatus database and/or the individual gripping apparatus database will not be part of some other embodiments. Any of the methods in the prior art, including those discussed herein, for ensuring that the information reaches from the transmitters in the gripping apparatuses to the central program, can be used in these embodiments.

A user may be able to identify themselves in the mobile program (23) by inputting their unique identifier into the mobile program (23).

In some embodiments of the invention, a user might be considered "associated" with a gripping apparatus if the user's computing device, running the mobile program (23) is within a certain proximity of that gripping apparatus; For example, within 10 feet of that gripping apparatus. The inventors are unsure if these embodiments will become widespread.

Users should also have the ability to use the mobile program to "disassociate" themselves from gripping apparatuses with which they were previously associated, so that after they "disassociate" themselves they would no longer be considered associated with those gripping apparatuses. Administrators of the system, such as administrators of a central program (24), may, in some embodiments, also have the ability to dissociate a user from a gripping apparatus.

The Individual user database, Combined Patient Database, Individual Gripping Apparatus Database, and Combined Gripping Apparatus Database The Individual user database (9) is a database in which identified use information pertaining to a unique individual user, and a unique identifier for the user, is stored. Most embodiments will also include the unique identifiers of the gripping apparatuses that the user was associated with in the past, and identified use information pertaining to the occasions that the user used those gripping apparatuses, such as the times that the grippers on those gripping apparatuses were opened or closed, and the movement of those gripping apparatuses. The Individual user database (9) can be used, among other reasons, to track the progress of a user's physical therapy, or healing, and to understand the history of a user's ailments, or to understand more about a user's medical history in general.

The Combined Patient Database (19) is a database where identified use information pertaining to all individual users, is stored. The unique identifiers for these users can also be stored in the Combined Patient Database, or, in some embodiments, these unique identifiers can be kept out of the Combined Patient Database, to preserve users' anonymity. Unique identifiers of the gripping apparatuses that each user was associated with in the past, and identified use information pertaining to the occasions that each user used each gripping apparatus, such as the times that the grippers on that gripping apparatus were opened or closed, while the user was associated with that gripping apparatus, and the movement of that gripping apparatus while the user was associated with that gripping apparatus, will also be stored in the Combined Patient Database in most embodiments.

In some embodiments, the Combined Patient Database (19) can also include use information from occasions no user was associated with a gripping apparatus, but the grippers on that gripping apparatus were open or closed, or the gripping apparatus moved. This use information could potentially be included in the Combined Patient Database (19) even in embodiments where the unique identifier of users, when available, are included in the Combined Patient Database. Such embodiments could be designed so that the unique identifier of the user will simply not be entered when not available, but other available information will be entered in a data point.

In embodiments where the unique identifiers of users are not included in the Combined Patient Database (19), identified use information from occasions where no user was associated with a gripping apparatus, but the grippers on that gripping apparatus were open or closed, or the gripping apparatus moved, can also be included in the Combined Patient Database (19).

The Combined Patient Database (19) can be used by researchers in many ways. For example, it can be used by researchers to find trends among when users use the gripping apparatuses, and how much a user will use a gripping apparatus of each type. The Combined Patient Database (19) can also be useful for tracking patient outcomes, and determining what kinds of outcomes are associated with certain patterns of use of the gripping apparatuses.

The individual gripping apparatus database (25) is a database where identified use information pertaining to a specific gripping apparatus is stored. It can be used, among other purposes, to track use of that gripping apparatus, and to decide when that gripping apparatus should be replaced. In some embodiments, an individual user or the user's caregiver could also potentially view the records in the individual gripping apparatus database for a certain gripping apparatus, pertaining to the time that the user needs to use, or has used, that gripping apparatus. By examining the records in the individual gripping apparatus database pertaining to the time that the user needs to use, or has used, that gripping apparatus, the user or the user's caregiver might gain information about patterns in the user's use of that gripping apparatus, without associating the user's unique identifier with the gripping apparatus's unique identifier.

The combined gripping apparatus database (31) is a database where use information from all gripping apparatuses that transmitted use information to the central program (24) is stored. The combined gripping apparatus database (31) can be used to track trends in the use of gripping apparatuses, and to decide when a gripping apparatus should be replaced, or on policy about when gripping apparatuses should be replaced. In some embodiments, only identified use information from all gripping apparatuses that transmitted identified use information to the central program (24) is stored in the combined gripping apparatus database (31).

Use of Non-Fungible Tokens

A blockchain is a digital ledger in which a record of transactions is kept and maintained across multiple computers that are linked in a peer-to-peer network. The multiple computers are decentralized "nodes" of the blockchain. Each of the computers carries a complete copy of the blockchain. New transactions on a blockchain are saved in "blocks" on the blockchain. For a block to be altered after it is created, the block would have to be altered across the entire network, which makes it unfeasible to alter the blocks after they have been entered into the blockchain.

A non-fungible token (NFT) is a unique digital identifier that cannot be copied, substituted, or subdivided, that is recorded in a blockchain, and that can be used to certify authenticity and/or ownership (as of a specific digital asset and specific rights relating to it). Non-fungible tokens can be used to certify that a digital asset is unique. Non-fungible tokens can be stored using blockchain technology.

Non-fungible tokens need to be "minted", meaning that they will be published on the blockchain. Minting often carries an additional cost, called "gas". Gas prices vary, so those minting an NFT should try to pick a time to mint when gas prices on that blockchain are relatively low.

Here, a non-fungible token can be minted for the individual user database of each user. This can provide exceptionally secure records of, and access to, the user's identified use information. These records can be accessed by the entity with custody of the non-fungible token. A NFT can be minted that provides access to the individual user database of each user, or to part of the individual user database for that user (For example, to the identified use data that was created while a certain user was using a certain gripping apparatus).

Likewise, NFTs can be minted that provide exceptionally secure records of, and access to, the Combined Patient Database (19), or to parts of the Combined Patient Database (19).

NFTs can also be minted that provide secure records of, and access to, the individual gripping apparatus database for each individual gripping apparatus, or the combined gripping apparatus database, or to part of the combined gripping apparatus database. An entity that owns or is considering purchasing a large number of gripping apparatuses might use one of these NFTs to examine the identified use information pertaining to the gripping apparatuses, to see how much they have been used and whether any of them likely need to be replaced.

The Central Program

The Central Program (24) in some embodiments of the invention is a program that receives information over the internet about the movement of multiple gripping apparatuses and possibly also other information, such as information about when components of the gripping apparatuses are activated, from the transmitters (13) connected to these multiple gripping apparatuses. This information will be hereafter part of "use information". The Central Program (24) can receive the use information directly or indirectly. One way, that it can receive the use information indirectly is that the Central Program (24) can receive some of the use information that was A. Received by users' computing devices from transmitters (13) attached to gripping apparatuses, that have broadcast this use information, and B. re-broadcast by the users' computing devices.

In some embodiments, when the Central Program (24) receives the use information, the central program (24) sends the identified use information sent by each individual gripping apparatus to an individual gripping apparatus database (25) for that gripping apparatus. The use information received by the Central Program from all gripping apparatuses can also be sent to a Combined Gripping Apparatus Database. In embodiments where it is possible to identify which user was controlling each gripping apparatus on the occasions when that gripping apparatus generated identified use information, The central program (24) can also send the identified use information that each user thus generated to an individual user database for that user. The central program (24) also can send all of the identified use information to a Combined Patient Database.

The central program (24), in some embodiments of the invention, can also be used to interact, either directly or indirectly, with a blockchain, and mint non-fungible tokens for the purposes discussed above.

The discussion included in this patent is intended to serve as a basic description. The reader should be aware that the specific discussion may not explicitly describe all embodiments possible, and alternatives are implicit, or obvious to those skilled in the art. Also, this discussion may not fully explain the generic nature of the invention and may not explicitly show how each feature or element can actually represent equivalent elements. Again, these are implicitly included in this disclosure. Where the invention is described in device-oriented terminology, each element of the device implicitly performs a function. It should also be understood that a variety of changes may be made to the embodiments that have been described, without departing from the essence of the invention. Such changes are implicitly included in the description. These changes still fall within the scope of this invention.

It is important to note that the software components of the invention can be structured in any way known in the prior art, including, but not limited to, being placed on a "cloud", or being placed on some type of central processor.

Furthermore, each of the various elements of the invention and claims may also be achieved in a variety of manners. This disclosure should be understood to encompass each such variation, whether it is a variation of an apparatus embodiment, a method embodiment, or a variation in any element of an embodiment. As the disclosure relates to elements of the invention, the words describing each element may be replaced by equivalent apparatus terms, even if only the function or result is the same. Such equivalent, broader, or even more generic terms should be considered to be encompassed in the description of each element or action. Such terms can be substituted, when desired, to make explicit the implicitly broad coverage to which this invention is entitled. It should be understood that all actions may be expressed as a means for taking the action in question, or may be expressed as an element for causing the action in question.

Similarly, each physical element disclosed should be understood to encompass a disclosure of the action which that physical element facilitates. Such changes and terms are to be understood to be explicitly included in the description.

The Remote Control Gripper

The remote control gripper (29) is a gripper attached to a remote control (11) in some embodiments of the invention. The remote control gripper (29) can have any of the configurations for a gripper discussed elsewhere in this application. The remote control gripper (29) is intended for the purpose of keeping the remote control (11) attached to a place where the user can use it conveniently, such as one of the rods that is part of a hospital bed.

The Suction Cup

A suction cup (30) is attached to the remote control (11) and/or the gripping apparatus in some embodiments of the invention. A suction cup (30) can be attached to a remote control, along with, or instead of, a remote control gripper (29), so that the remote control can be easily attached to a location like a wall, and found easily when the user wants to find it. A suction cup (30) can be attached to a gripping apparatus so that the gripping apparatus can be easily attached to a location like a wall, and found easily when the user wants to find it.

Other Embodiments

Other embodiments of the invention are possible. For example, an embodiment with a central rod (1) that has variable length is possible. All ways of creating such a central rod are explicitly within the prior art. One way of creating such a central rod is for the central rod to include two or more subsections, with a stiffening component for holding the two subsections in place. The stiffening component could also be loosened when the central rod's length needs to be adjusted.

For example, in one version the two or more subsections can each have a groove. The stiffening component can include a part that fits into each of the grooves. The stiffening component will include other parts that are too large to fit through the grooves, so the stiffening component will be permanently in contact with the subsections. The stiffening component, in this version and similar versions, can be loosened to allow the user to change the amount of the lengths of the subsections that overlap. Then, the stiffening component can be tightened, which will ensure that the subsections stay in the same positions relative to each other.

BRIEF DESCRIPTION OF THE DRAWINGS

The accompanying drawings illustrate various embodiments of systems, methods, and embodiments of various other aspects of the disclosure. Any person with ordinary skill in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

The user can observe how much the user has used the gripping apparatus by examining the individual user database (9) using the mobile program (23).

Figure 20:
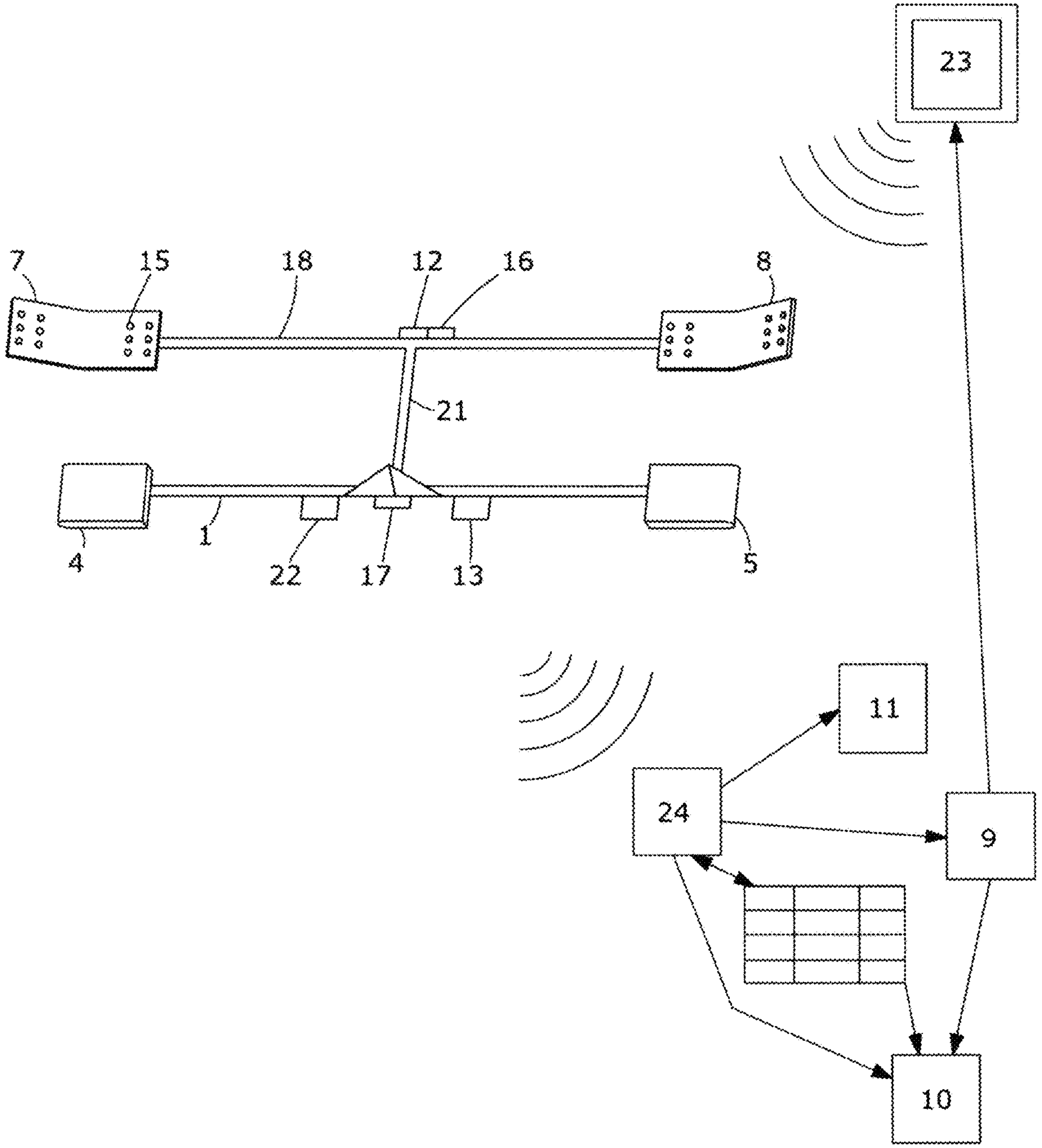

FIG. 20 shows an embodiment of the invention where the gripping apparatus includes a hard first gripper (4), and hard second gripper (5). Both are attached to a central beam (1). The gripping apparatus includes a subsidiary first gripper (7) and subsidiary second gripper (8) connected to a subsidiary beam (18) which is connected to a vertical beam (21), which is in turn connected to the central beam (1). The subsidiary first gripper (7) and subsidiary second gripper (8) also include electromagnets (15) and Velcro. The gripping apparatus includes a battery (12) that provides power to the electromagnets, movement sensor, transmitter, receiver, and the hard first gripper and hard second gripper. The hard first gripper and hard second gripper can open and close using this power, and the poles of the electromagnets in the subsidiary first gripper (7) and subsidiary second gripper (8) can be made to attract oppositely charged poles of other electromagnets using this power. The gripping apparatus also includes a movement sensor (22) attached to the central beam and operatively connected to the first gripper (2), second gripper (3), subsidiary first gripper (7) and subsidiary second gripper (8). A transmitter (13) is operatively connected to the movement sensor (22). A receiver (17) is operatively connected to the hard first gripper (4), hard second gripper (5), subsidiary first gripper (7) and subsidiary second gripper (8).

The user has a computing device, on which the mobile program (23) is installed. The user can use the mobile program (23) to communicate with the receiver (16) on the gripping apparatus, and send commands to the receiver (16) on the gripping apparatus, commanding any of the hard first gripper (4), hard second gripper (5), subsidiary first gripper (7) or subsidiary second gripper (8) to open or close.

The movement sensor (22) sends identified use information to the transmitter (13), stating when the gripping apparatus moves, including when each of the hard first gripper (4), hard second gripper (5), subsidiary first gripper (7) and subsidiary second gripper (8) opens or closes. The transmitter (13) broadcasts this identified use information.

The identified user information is sent over the internet until it reaches the central program (24), and the central program (24) then integrates the identified user information into the individual user database (9) and the combined patient database (19). The central program (24) also has caused the minting of a non-fungible token (10) that gives access to the individual user database (9) of the user.

The user, in this version, can view the individual user database (9) of the user with the mobile program (23), and is accessible to the user's mobile program (23) over the internet.

Figure 21:
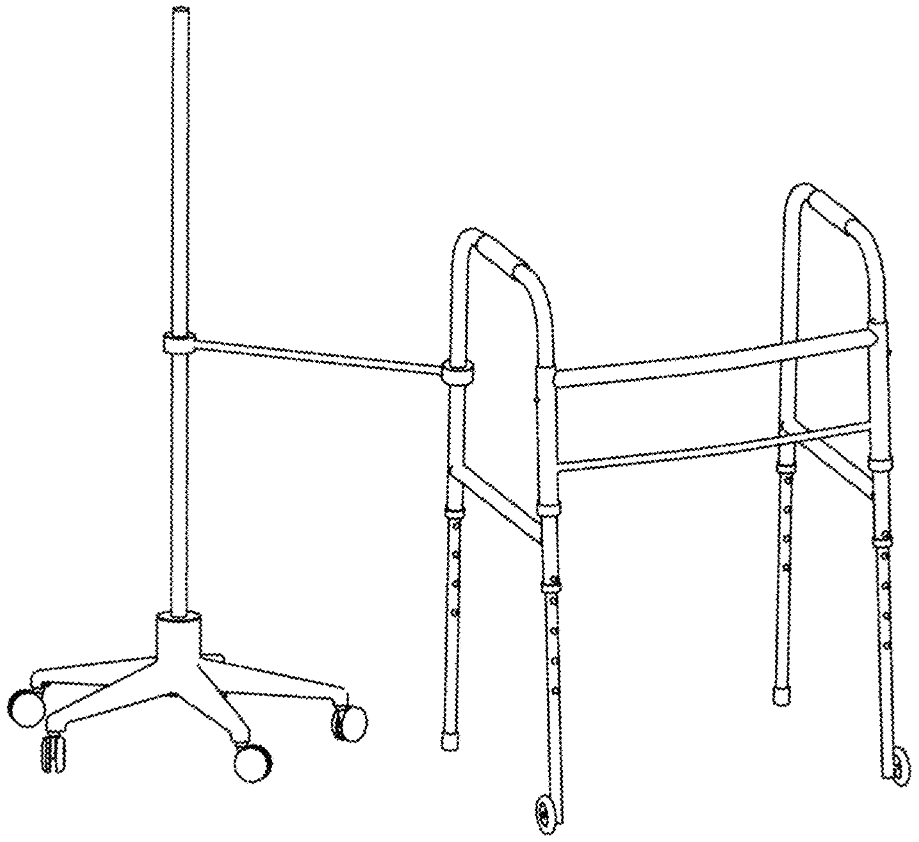

FIG. 21 shows an embodiment of the invention with an intravenous pole permanently connected to a walker.

Figure 22:
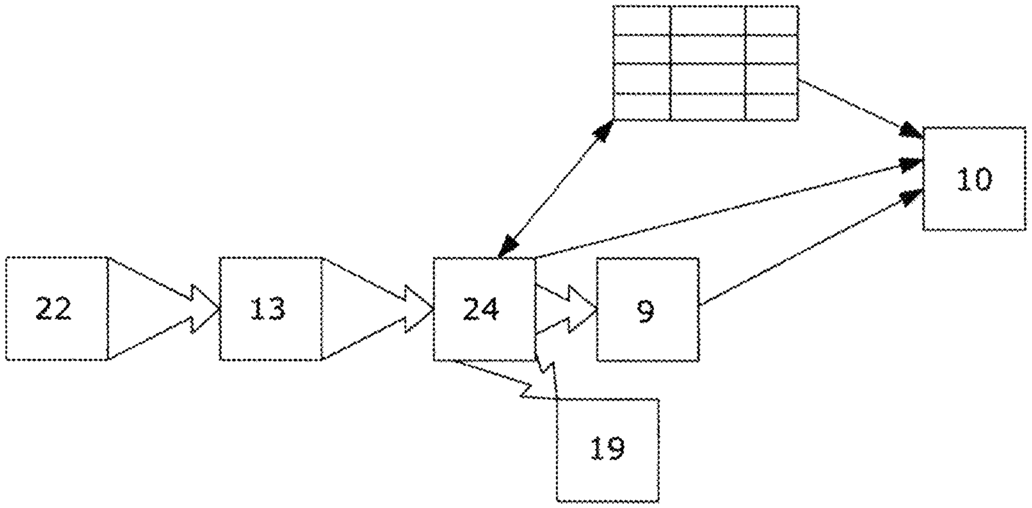

FIG. 22 is a flow chart of the flow of information in one embodiment of the invention, with a gripping apparatus that has a transmitter (13) and a movement sensor (22). A user uses the gripping apparatus. The movement sensor (22) records use information (identified use information in this version) based on the movements of the gripping apparatus, and the opening and closing of the grippers, and the transmitter (13) broadcasts this identified use information. This identified use information is sent over the internet to the central program (24). The central program (24) integrates this identified use information into the individual user database (9), and the combined patient database (19). The central program also interacts with a blockchain so that a non-fungible token (10) giving access to the individual user database (9) is minted.

Figure 23:
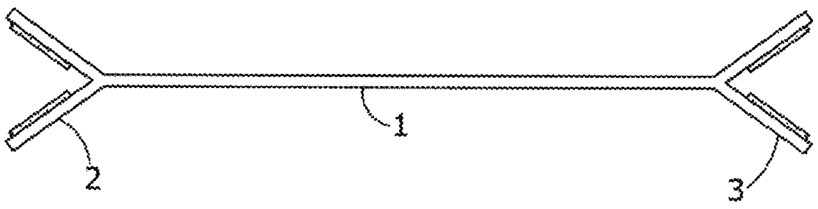

FIG. 23 is a version of the first embodiment of the invention where the first gripper (2) and second gripper (3) are each connected to the central beam (1) at one point.

Figure 24:
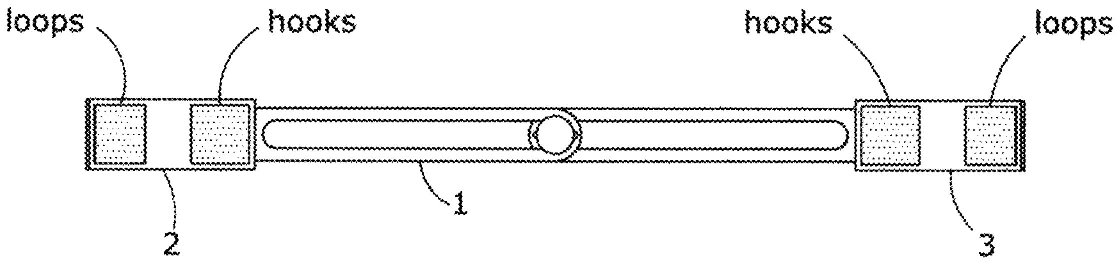

FIG. 24 is a version of the first embodiment of the invention with a central rod (1) of variable length. The two subsections of the central rod, and the stiffening component, can be seen. The user can loosen the stiffening component by loosening a bolt, move the subcomponents relative to each other, and then tighten the bolt on the stiffening component so that it forces the subsections to stay in one place relative to each other.

Figure 25:
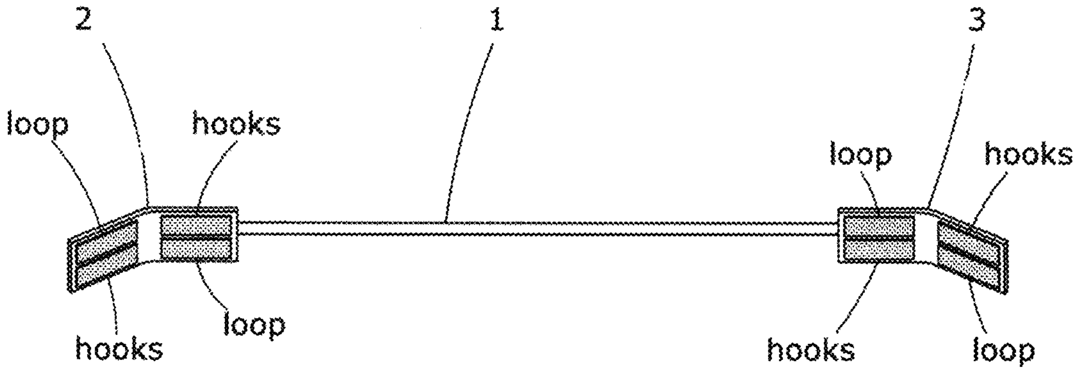

FIG. 25 is an embodiment of the invention with Velcro patches with hooks next to Velcro patches with loops on the first gripper (2) and second gripper (3).

Figure 26:
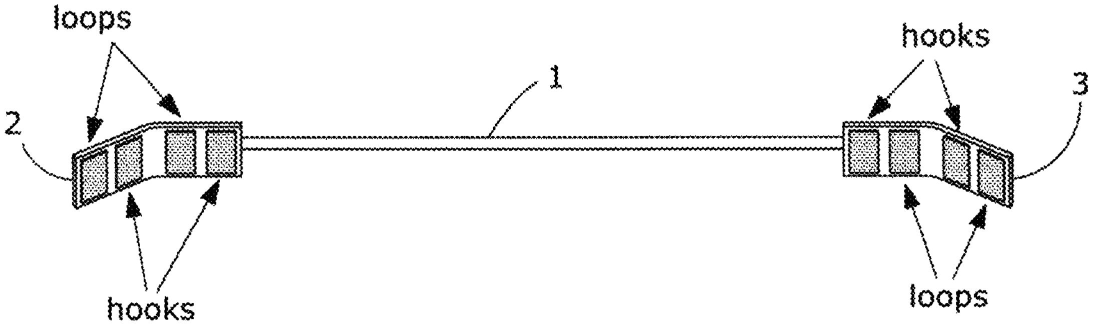

FIG. 26 shows an embodiment of the invention with more than two Velcro patches on the inner sides (27) of the first gripper and second gripper.

Figure 27:
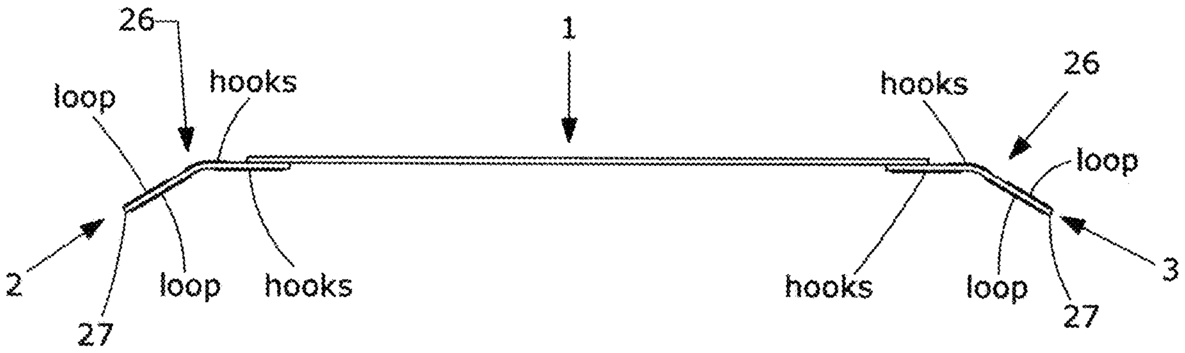

FIG. 27 shows a top-down view of an embodiment of the invention with Velcro patches on the outer sides (26) of the first gripper and second gripper.

Figure 28:
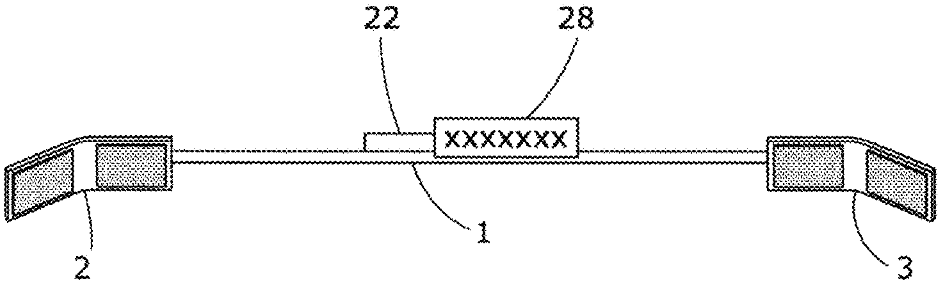

FIG. 28 shows a version of an embodiment of a gripping apparatus with a movement indicator (28). The movement indicator is connected to a movement sensor (22). The movement sensor senses movement of the gripping apparatus, and senses when the first gripper (2) and second gripper (3) open and close.

Figure 29:
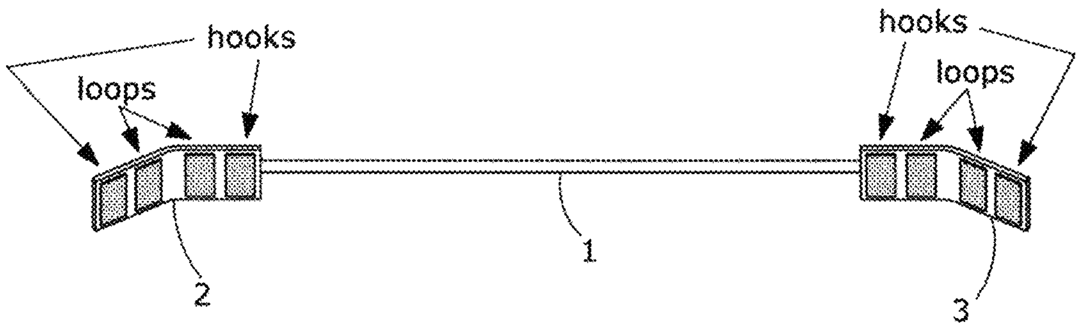

FIG. 29 shows a version of an embodiment of a gripping apparatus where each gripper includes multiple Velcro patches containing hooks and multiple Velcro patches containing loops. A user can pick which of the Velcro patches containing hooks the user wishes to attach to each of the looped patches, or decide to not attach some hooked patches to looped patches and/or to not attach some looped patches to hooked patches.

Figure 30:
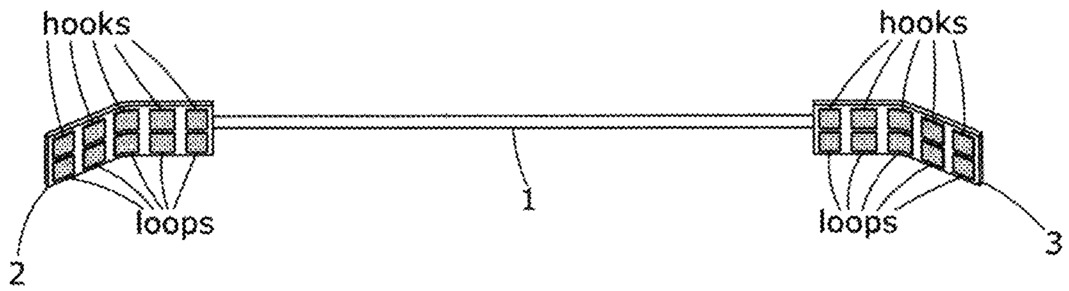

FIG. 30 shows a version of an embodiment of a gripping apparatus where each gripper includes Velcro patches with hooks and Velcro patches with loops next to each other.

Figure 31:
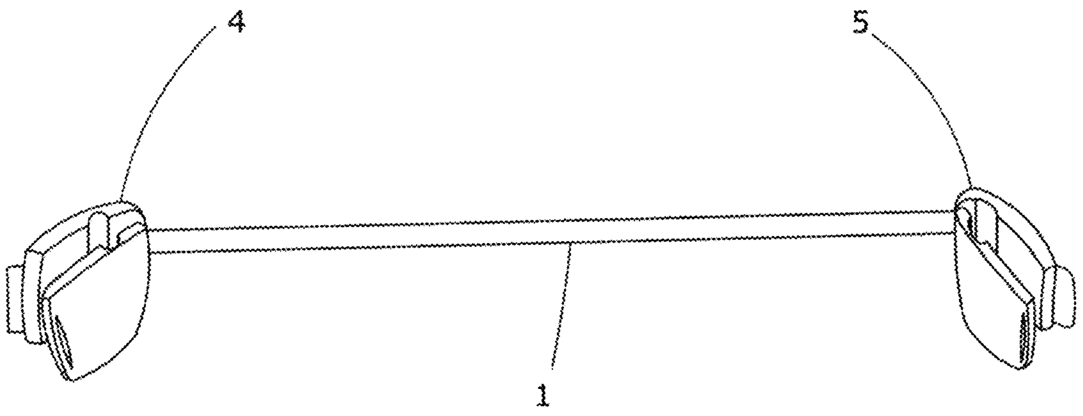

FIG. 31 shows a version of an embodiment of a gripping apparatus where parts of each gripper interlock with each other. The grippers are open, so the viewer can see how the parts of each gripper can interlock with the other parts of that gripper. The user can press onto one of these parts of a gripper to cause the parts of that gripper to interlock. The user can also move one of the parts of a gripper to cause those parts to stop interlocking.

Figure 32:
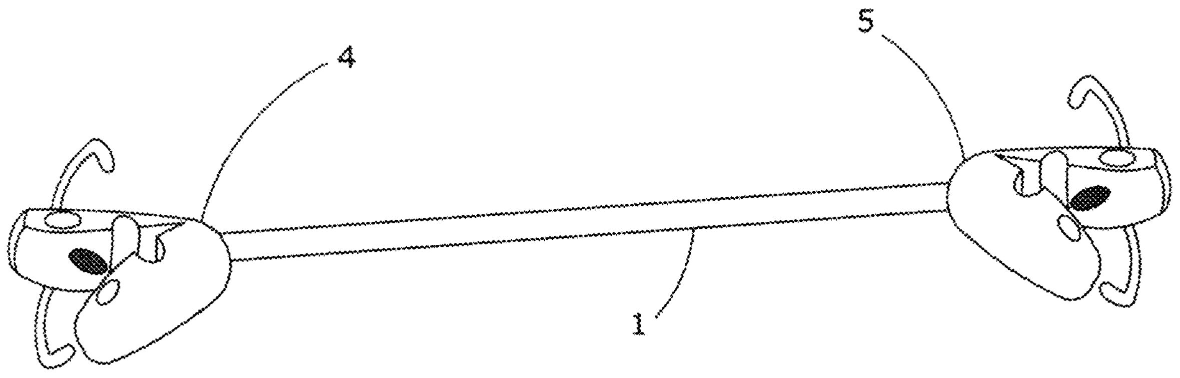

FIG. 32 shows a version of an embodiment of a gripping apparatus with two hard grippers (4) and (5), where two screw-like components help parts of each hard gripper to interlock with each other. The hard grippers also include Velcro patches. The hard grippers are open.

Figure 33:
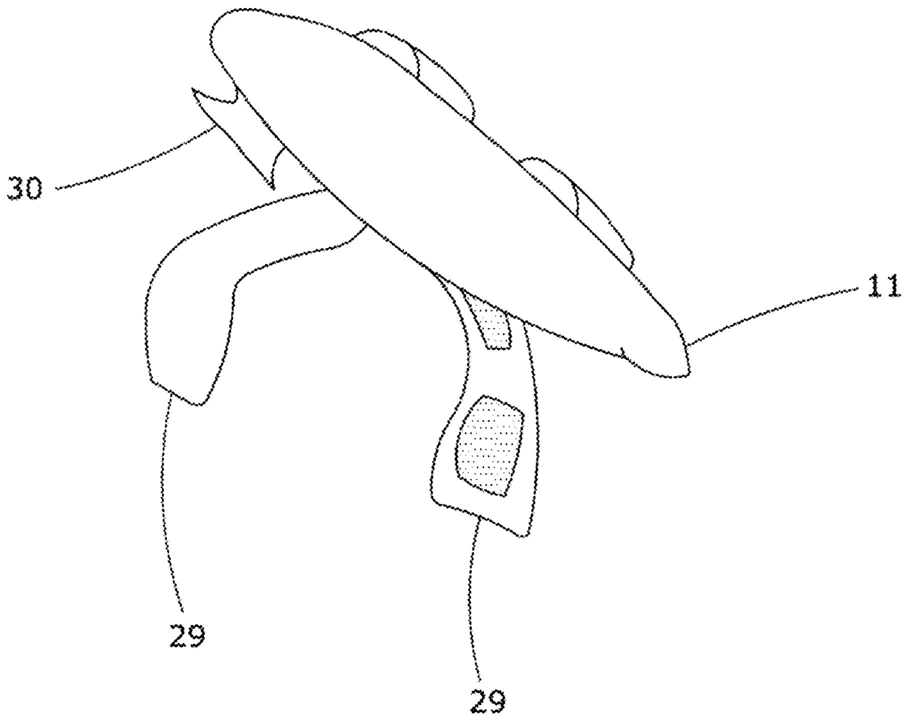

FIG. 33 shows a version of an embodiment of the remote control with a remote control gripper (29) and a suction cup (30). The user can use the remote control gripper or suction cup to attach the remote control to a location such as a wall, or a part of a bed, so that the user can easy access the remote control later.

Figure 34:
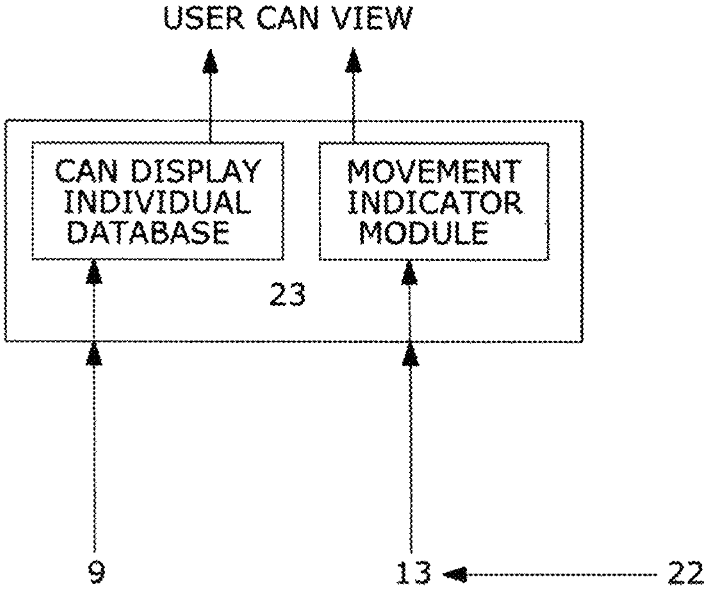

FIG. 34 shows a diagram of how information flows from a user to a version of the mobile program (31), and how this version of the mobile program (31) makes information available to the user. The movement indicator module makes available to the user identified use information that it receives from a transmitter on a nearby gripping apparatus. The mobile program also connects to the individual database (9) and displays the individual database (9) for the user to that user.

Figure 35:
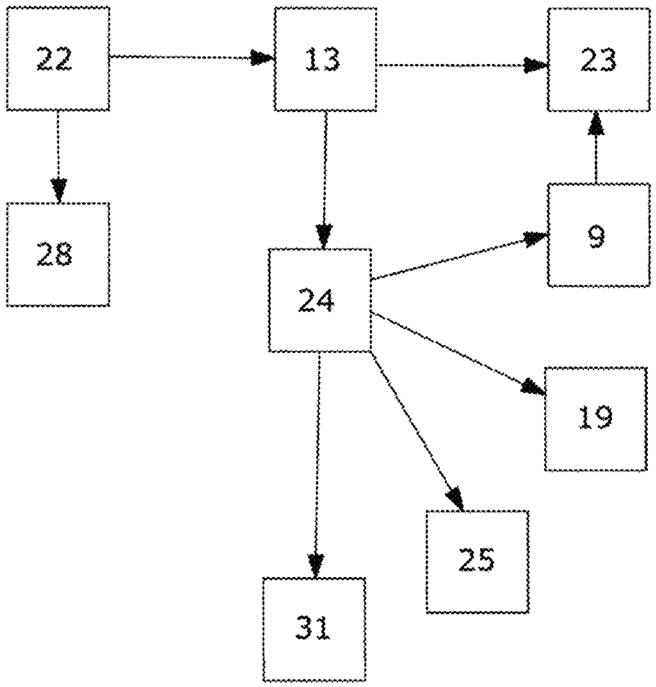

FIG. 35 shows flows of information when a version of an embodiment of the gripping apparatus interacts with a version of the mobile program, and a version of the central program.

Figure 36:
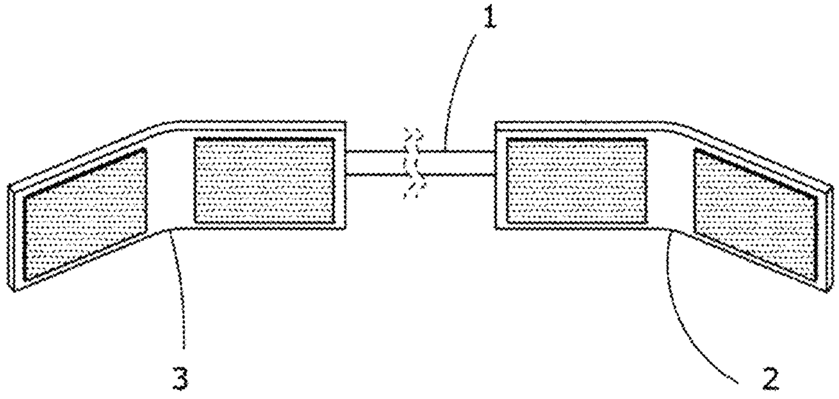

FIG. 36 shows a version of an embodiment of a gripping apparatus with an exceptionally large first gripper (2) and second gripper (3) and a central beam (1).

DETAILED DESCRIPTION OF THE DRAWINGS

Figure 1:
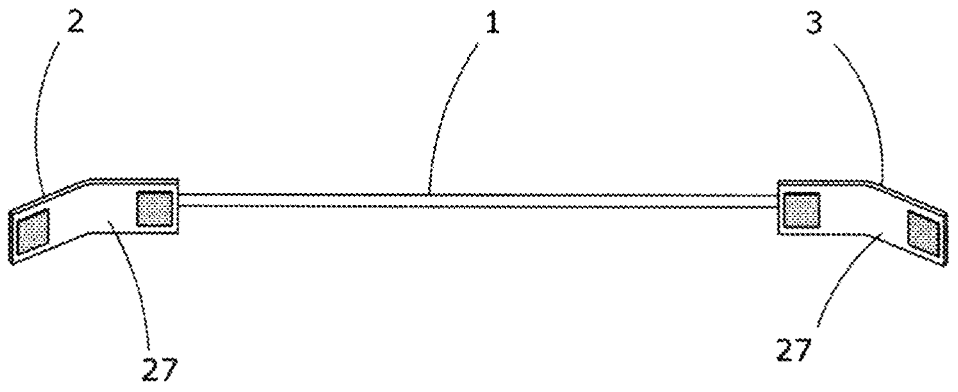
FIG. 1 shows a front view of a version of the first embodiment of the invention. The first gripper (2) and second gripper (3) use Velcro and the first and second grippers are open. The inner side (27) of the first gripper (2) and inner side (27) of the second gripper can be seen.

FIG. 1 shows a front view of a version of the first embodiment of the invention wherein a portion of each gripper starting at the edge of that gripper closest to the center of the central rod is attached to the central rod. The grippers are open, and both grippers use Velcro. The first gripper (2) is next to the intravenous pole and the second gripper is next to the walker. The central rod (1) connects the first and second grippers. Both the first and second grippers have Velcro patches on their inner sides. The inner side (27) of the first gripper (2) and inner side (27) of the second gripper (3) can be seen.

Figure 2:
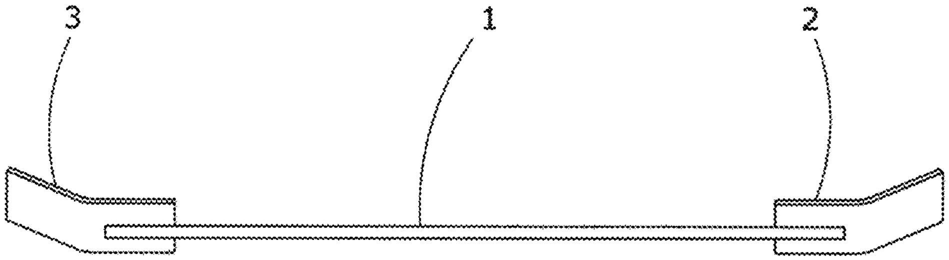
FIG. 2 shows a back view of a version of the first embodiment of the invention. The first gripper (2) and second gripper (3) use Velcro and the first and second grippers are open.

FIG. 2 shows a back view of a version of the first embodiment of the invention wherein a portion of each gripper starting at the edge of that gripper closest to the center of the central rod is attached to the central rod. The grippers are open, and both grippers use Velcro. The central rod (1) connects the first and second grippers. Both the first and second grippers have Velcro patches on their insides. The outer side (26) of the first gripper (2) and outer side (26) of the second gripper (3) can be seen.

Figure 3:
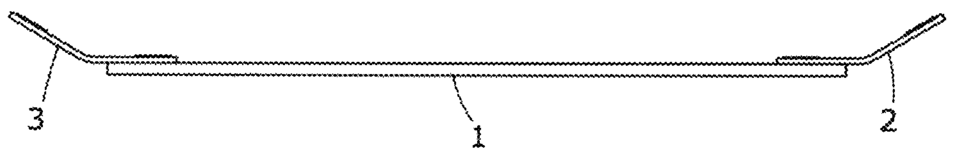
FIG. 3 shows a top view of a version of the first embodiment of the invention. The first gripper (2) and second gripper (3) use Velcro and the first and second grippers are open.

FIG. 3 shows a top view of a version of the first embodiment of the invention wherein a portion of each gripper starting at the edge of that gripper closest to the center of the central rod is attached to the central rod. The grippers are open, and both grippers use Velcro. The portion of the first gripper (2) and second gripper (3) that are attached to the central rod (1) can be seen.

Figure 4:
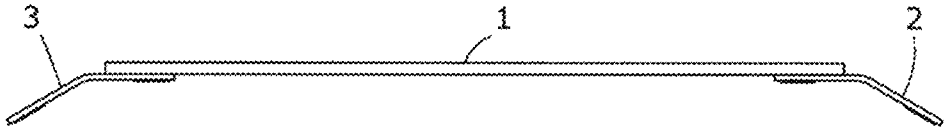
FIG. 4 shows a bottom view of a version of the first embodiment of the invention. The first gripper (2) and second gripper (3) use Velcro and the first and second grippers are open.

FIG. 4 shows a bottom view of a version of the first embodiment of the invention wherein a portion of each gripper starting at the edge of that gripper closest to the center of the central rod is attached to the central rod. The grippers are open, and both grippers use Velcro. The portion of the first gripper (2) and second gripper (3) that are attached to the central rod (1) can be seen.

Figure 5:
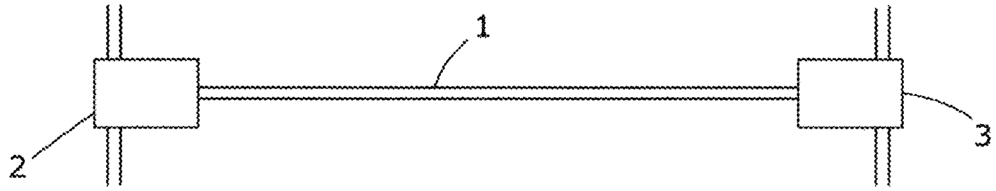
FIG. 5 shows a front view of a version of the first embodiment of the invention. The first gripper (2) is closed, holding an intravenous pole, and the second gripper (3) is closed, holding one of the legs of a walker.

FIG. 5 shows a front view of a version of the first embodiment of the invention wherein a portion of each gripper starting at the edge of that gripper closest to the center of the central rod is attached to the central rod. The embodiment is holding an intravenous pole and a walker with the Velcro grippers closed.

Figure 6:
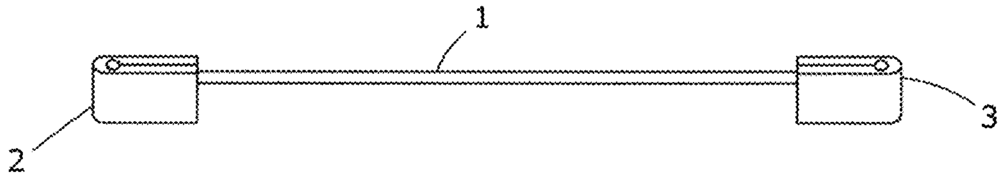
FIG. 6 shows a front view of a version of the first embodiment of the invention with a hard first gripper (4) and hard second gripper (5). Both the hard first gripper (4) and hard second gripper (5) are made of hard plastic.

FIG. 6 shows a front view of the first embodiment of the invention with a first hard gripper (4), and a second hard gripper (5), wherein a portion of each hard gripper starting at the edge of that hard gripper closest to the center of the central rod is attached to the central rod.

Figure 7:
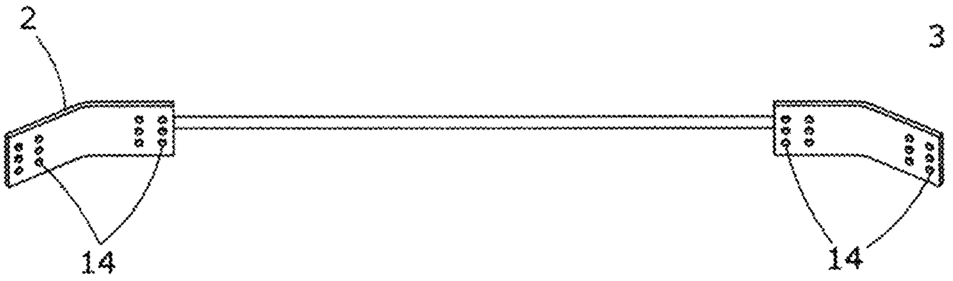
FIG. 7 shows a front view of a version of the first embodiment of the invention with a first gripper (2) and second gripper (3) that both include magnets (14). The magnets can be used to make the first gripper and second gripper close and keep them closed.

FIG. 7 shows a front view of the first embodiment of the invention with magnets (14) in the first gripper (2) and second gripper (3). The poles of the magnets attract oppositely charged poles of other magnets. The poles of the magnets on each gripper attract oppositely charged poles of other magnets on the other side of that gripper. A user can cause the first gripper and second gripper to grip objects such as the intravenous pole and walker securely. If the user places the magnets on the first gripper close to those magnets on the other side of the first gripper, positively charged parts of the magnets will stick to negatively charged parts of other magnets. Thus the first gripper can be wrapped around a piece of equipment such as an intravenous pole, and made to stay wrapped around it.

Figure 8:
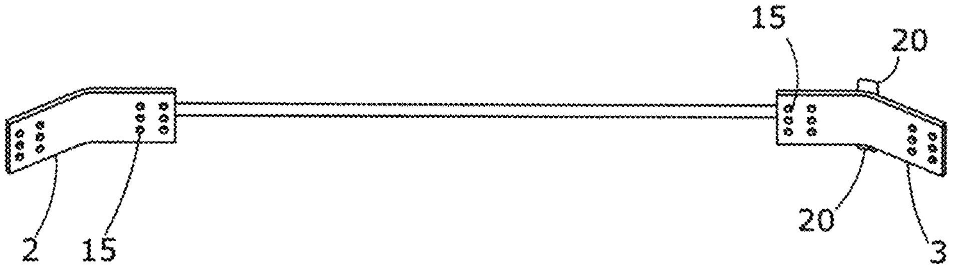
FIG. 8 shows a front view of a version of the first embodiment of the invention with first and second grippers that include electromagnets (15), and comprising, on one of the grippers, a control panel (22) that controls the electromagnets.

FIG. 8 shows a front view of the first embodiment of the invention with electromagnets (15) in both the first gripper (2) and second gripper (3). On top of the second gripper (3) is a control panel (20). The control panel (20) connects to the electromagnets in the grippers and activates them when desired by the user.

Figure 9:
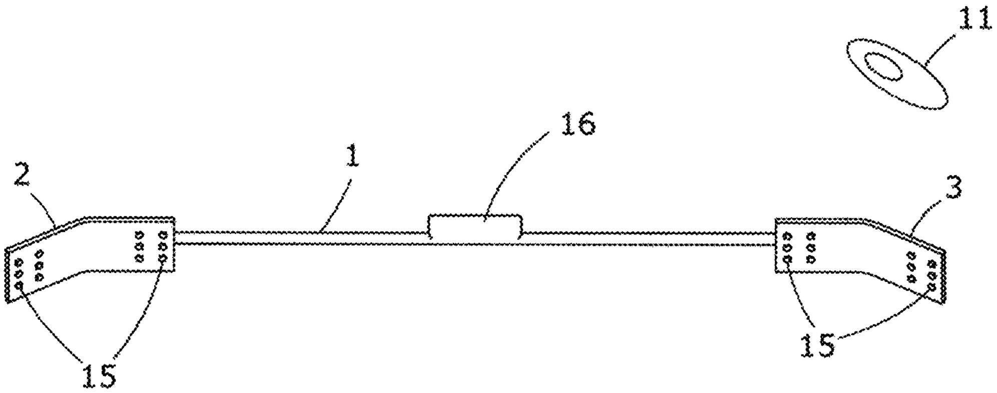
FIG. 9 shows a version of the second embodiment of the invention with a front view of the gripping apparatus, with a first gripper (2) and second gripper (3) that include electromagnets (15), and a receiver on the central beam (1) that connects to the first and second grippers. A remote control (11) which controls the electromagnets (15) is also depicted.

FIG. 9 shows a version of the second embodiment of the invention with a front view of the gripping apparatus, with a first gripper (2) and second gripper (3) that include electromagnets (15), and a receiver on the central beam (1) that connects to the first and second grippers. A remote control (11) which controls the electromagnets (15) is also depicted. The user can use the remote-control button (11) to send signals to the receiver (16), commanding the electromagnets to activate.

Figure 10:
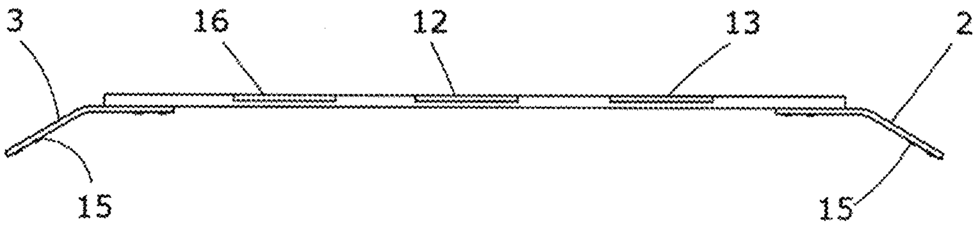
FIG. 10 shows a cut-away view of one version of the gripping apparatus that is part of the second embodiment of the invention, with a central beam (1), first gripper (2), and second gripper (3). The first gripper (2), and second gripper (3) are attached to the central beam (1). On the back of the central beam (1) is a battery (12), a receiver (16), and a transmitter (13).

FIG. 10 shows a cut-away view of one version of the gripping apparatus that is part of the second embodiment of the invention, with a central beam (1), first gripper (2), and second gripper (3). The first gripper (2), and second gripper (3) are attached to two ends of the central beam (1). On the back of the central beam (1) is a battery (12), a receiver (16), and a transmitter (13). The battery powers the receiver and the transmitter. It is important to note that the battery (12), receiver (16), and transmitter (13) can be located in other parts of the gripping apparatus besides the back of the central beam.

Figure 11:
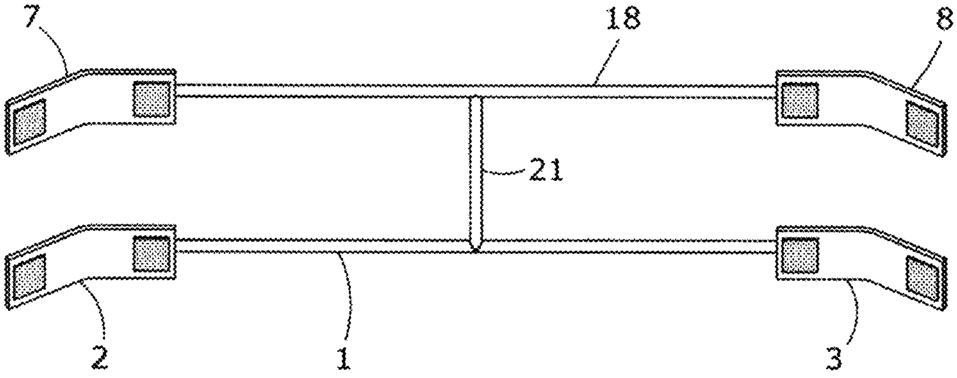
FIG. 11 shows a version of the third embodiment of the invention with a first gripper (2), and second gripper (3). A subsidiary first gripper (7) and a subsidiary second gripper (8) are connected to a subsidiary beam (18) which is connected to a vertical beam (21). The vertical beam (21) is connected to the central beam (1).

FIG. 11 shows a version of the third embodiment of the invention with a first gripper (2), and second gripper (3). A subsidiary first gripper (7) and a subsidiary second gripper (8) are connected to a subsidiary beam (18) which is connected to a vertical beam (21). The vertical beam (21) is connected to the central beam (1). This allows the subsidiary first gripper (7) and first gripper (2) to grip the same object, thus gripping it more securely.

Figure 12:
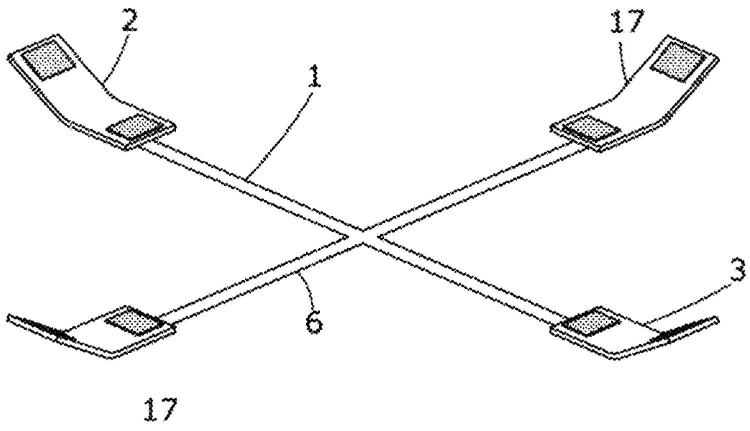
FIG. 12 shows a version of the fourth embodiment of the invention with a cross-beam (6) attached to the central beam (1) and two angular grippers attached to the cross-beam (6).

FIG. 12 shows a version of the fourth embodiment of the invention with a cross-beam (6) attached to the central beam (1) and two angular grippers (17) attached to the cross-beam (6). A first gripper (2) and a second gripper (3) are attached to the central beam.

Figure 13:
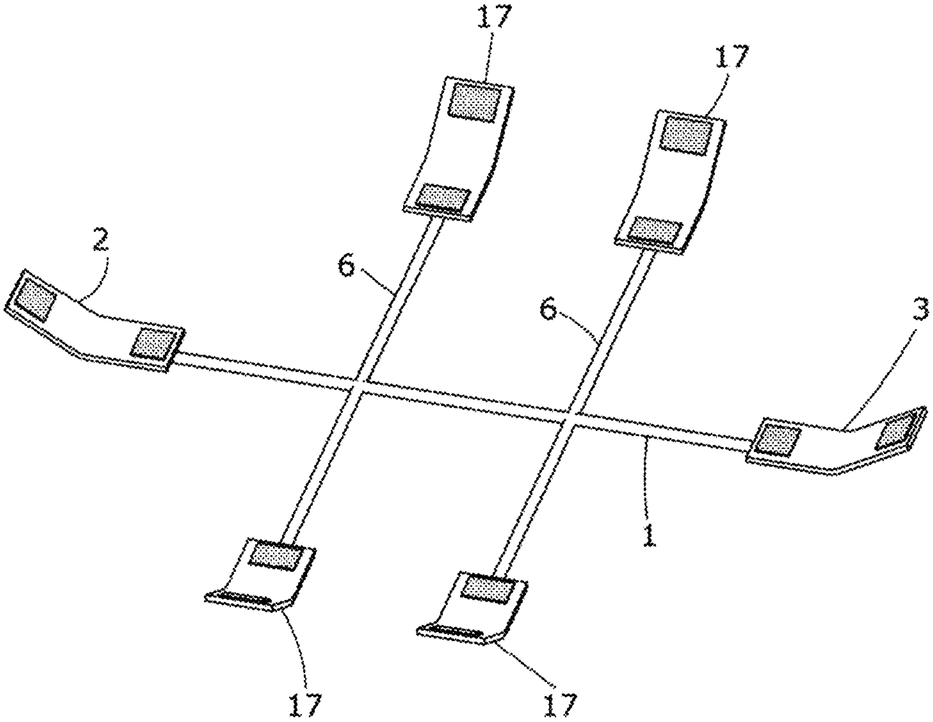
FIG. 13 shows a version of the fourth embodiment of the invention with two cross-beams (6) and two angular grippers attached to each of the cross-beams.

FIG. 13 shows a version of the fourth embodiment of the invention with two cross-beams (6). Two angular grippers (17) are attached to each of the cross-beams (6). This version of the fourth embodiment of the invention has a first gripper (2) and a second gripper (3) attached to the central beam (1). The two cross-beams (6) are attached to the central beam (1). This version of the fourth embodiment has a total of six grippers.

Figure 14:
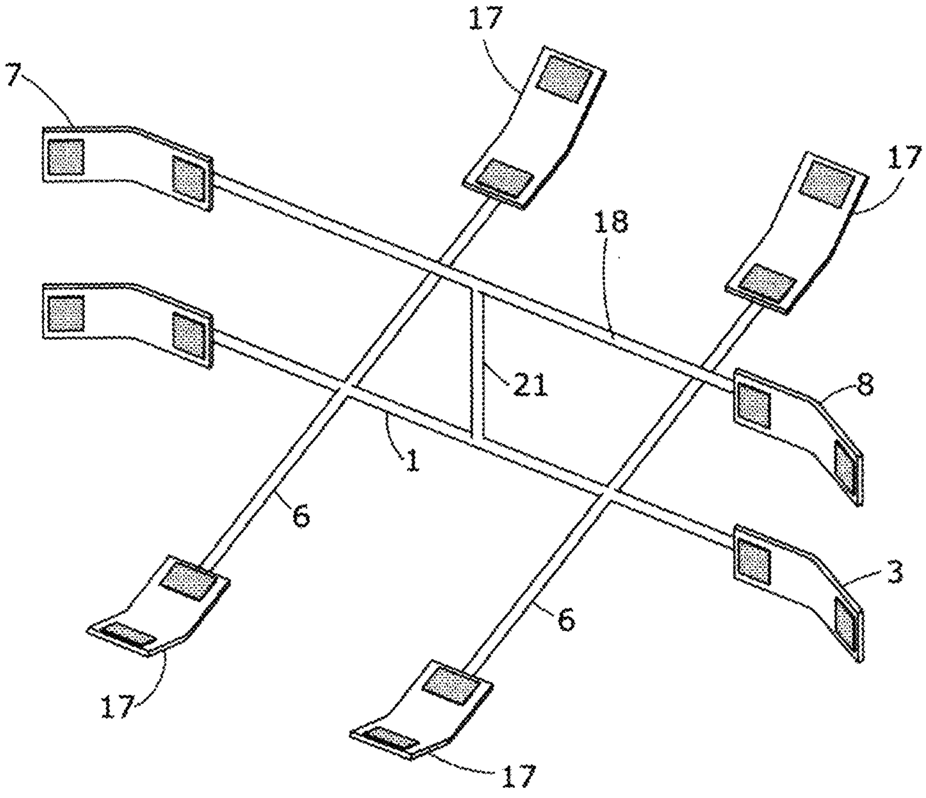
FIG. 14 shows a version of the fifth embodiment of the invention with two cross-beams (6) and two angular grippers attached to each of the cross-beams. A subsidiary first gripper (7) and a subsidiary second gripper (8) are connected to a subsidiary beam (18) which is connected to a vertical beam (21). The vertical beam (21) is connected to the central beam (1).

FIG. 14 shows a version of the fifth embodiment of the invention with two cross-beams (6) and two angular grippers attached to each of the cross-beams. A subsidiary first gripper (7) and a subsidiary second gripper (8) are connected to a subsidiary beam (18) which is connected to a vertical beam (21). The vertical beam (21) is connected to the central beam (1). A first gripper (2) and second gripper (3) are also attached to the central beam (1). This version of the fifth embodiment has a total of eight grippers.

Figure 15:
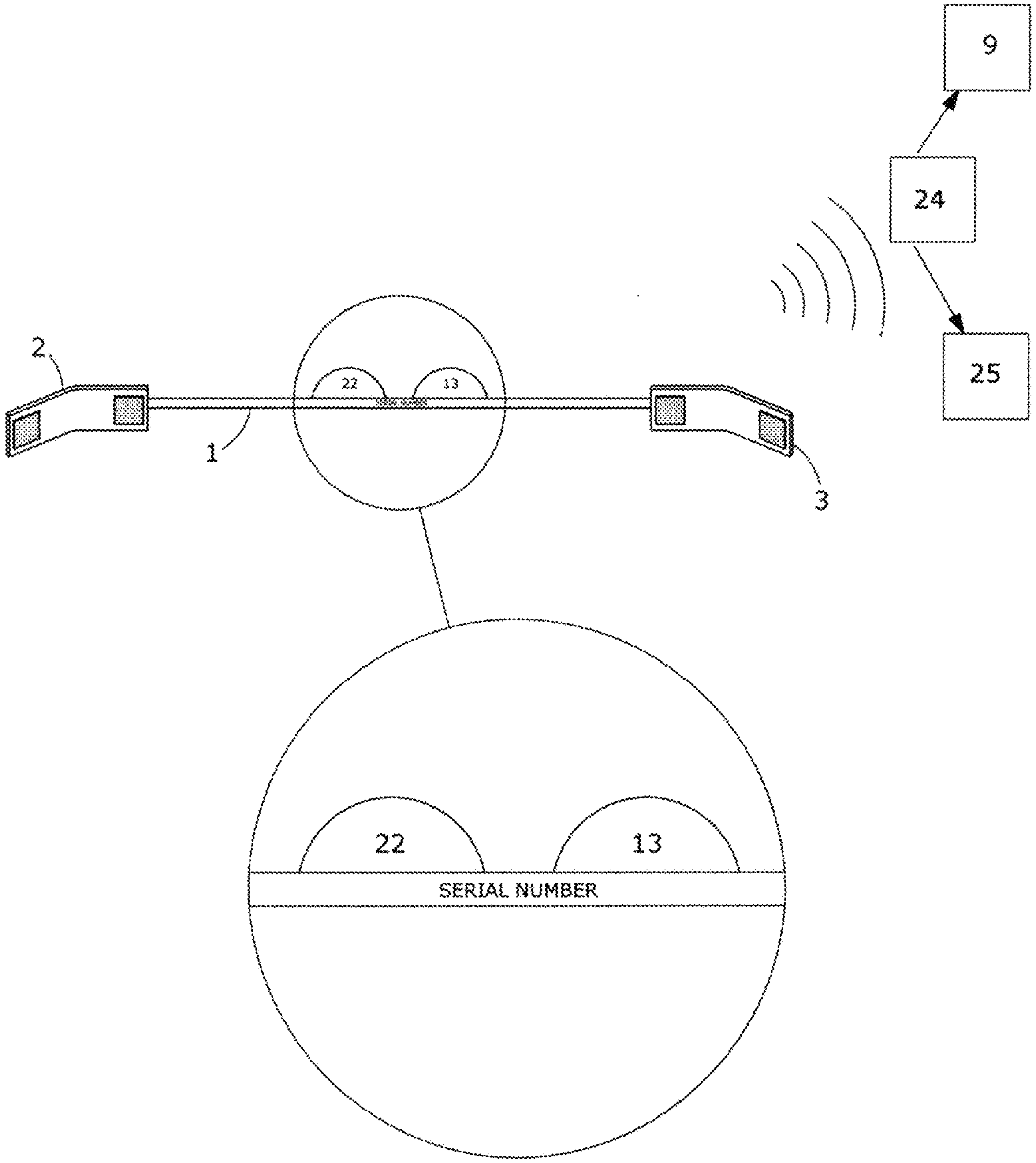
FIG. 15 shows a diagram of the sixth embodiment of the invention. The first gripper (2) and second gripper (3) are connected to a central beam (1). Also attached to the central beam are a movement sensor (22) and a transmitter (13). The movement sensor sends use information (In this particular version, identified use information) about the gripping apparatus's movement to the transmitter (13), which broadcasts the identified use information. The identified use information is then transmitted over the internet to receiving stations elsewhere. The central program (24) receives this identified use information and then enters the identified use information into the individual user database (9).

FIG. 15 shows a diagram of the sixth embodiment of the invention. The first gripper (2) and second gripper (3) are connected to a central beam (1). Also attached to the central beam are a movement sensor (22) and a transmitter (13). The gripping apparatus has a unique identifier. The movement sensor sends identified use information about the gripping apparatus's movement to the transmitter (13), which broadcasts the identified use information, transmitting the identified use information to receiving stations elsewhere. The central program (24) receives this identified use information and then enters the identified use information into the individual user database (9). The central program (24) also enters the identified use information into an individual gripping apparatus database (25) for the gripping apparatus that sent the identified use information.

Figure 16:
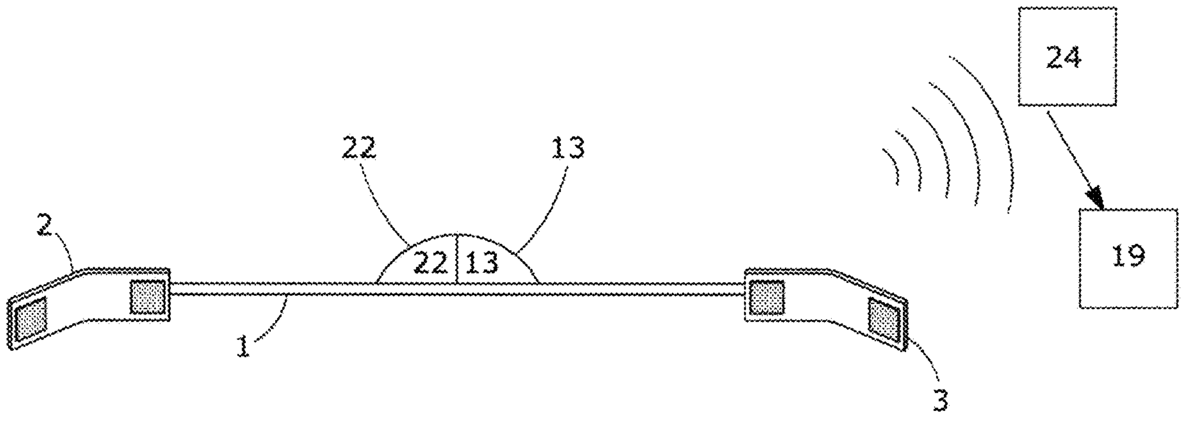
FIG. 16 shows a version of the seventh embodiment of the invention. Here, the movement sensor (22) sends use information (In this particular version, identified use information) about the gripping apparatus's movement to the transmitter (13), which transmits the identified use information over the internet to receiving stations elsewhere. The central program (24) receives this identified use information and then enters the identified use information into the combined patient database (19). The information in the combined patient database (19) can then be examined further, so that researchers can understand how the gripping apparatuses are being used, and whether patients who need to use the gripping apparatuses are doing adequate amounts of movement.

FIG. 16 shows a version of the seventh embodiment of the invention. Here, the movement sensor (22) sends identified use information about the gripping apparatus's movement to the transmitter (13), which transmits the identified use information over the internet to receiving stations elsewhere. The central program (24) receives this identified use information over the internet and then enters the identified use information into the combined patient database (19). The information in the combined patient database (19) can then be examined further, so that researchers can understand how the gripping apparatuses are being used, and whether patients who need to use the gripping apparatuses are doing adequate amounts of movement, and potentially discover other things about users of the gripping apparatuses.

Figure 17:
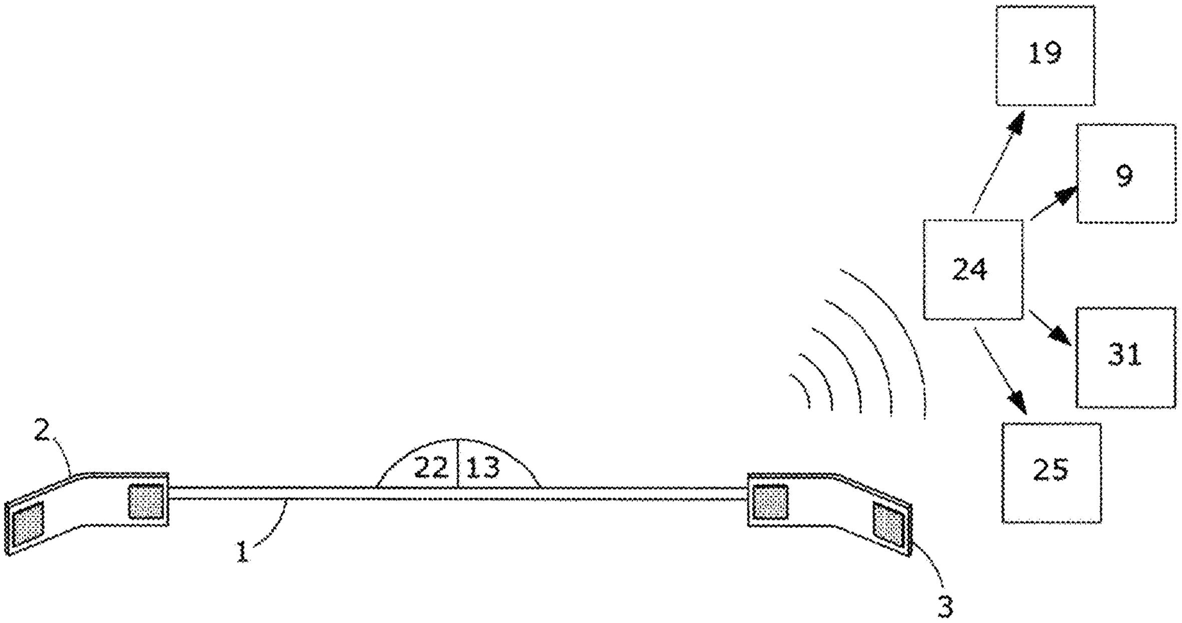
FIG. 17 shows a version of the eighth embodiment of the invention. Here, the movement sensor sends information (Identified use information, in this case) about the gripping apparatus's movement to the transmitter (13), which transmits the information to receiving stations elsewhere. The central program (24) receives this identified use information using the internet and then enters the identified use information into both the individual database (9) and the combined patient database (19). In this version of the eighth embodiment, the central program also enters the identified use information for each gripping apparatus into an individual gripping apparatus database (25) and enters the use information it has received from all gripping apparatuses into a combined gripping apparatus database (31).

FIG. 17 shows a version of the eighth embodiment of the invention. The movement sensor sends information (Identified use information, in this case) about the gripping apparatus's movement to the transmitter (13), which transmits the information to receiving stations elsewhere. The Central Program (24) then receives this identified use information using the internet and then enters this identified use information into both the individual database (9) and the combined patient database (19). In this version of the eighth embodiment, the central program also enters the identified use information for each gripping apparatus into an individual gripping apparatus database (25) and the use information that it has received from all gripping apparatuses into a combined gripping apparatus database (31).

Figure 18:
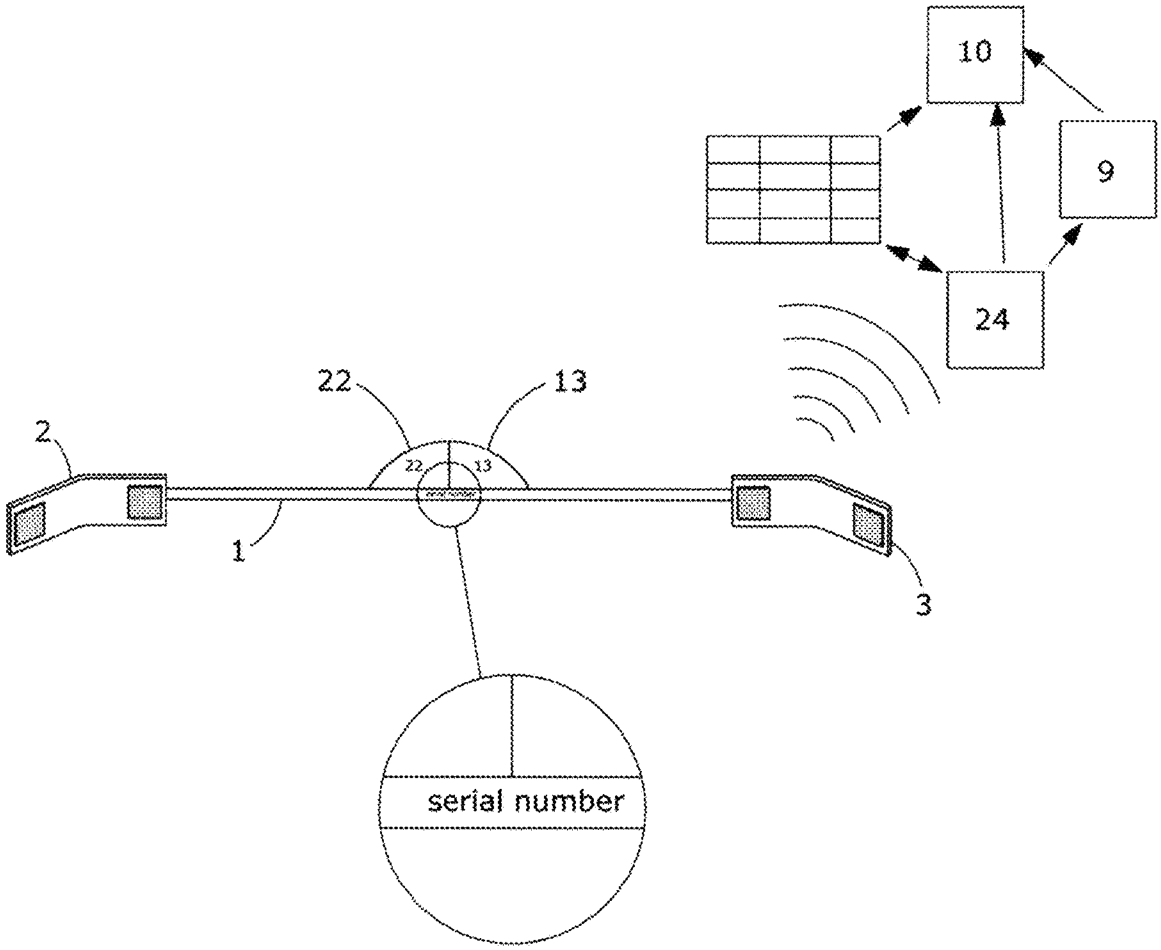
FIG. 18 shows a version of the ninth embodiment of the invention that records the user's identified use information in an individual user database (9) connected to a non-fungible token (10). Here, the movement sensor (22) on the gripping apparatus is connected to a transmitter (13). The gripping apparatus has a serial number, a type of unique identifier. The movement sensor sends identified use information to the transmitter (13), which broadcasts the identified use information. The identified use information is then transmitted over the internet to the central program (24). The central program (24) saves the identified use information pertaining to the user in an individual user database (9). The central program (24) has interacted with a blockchain to mint a non-fungible token (10) that provides access to the individual user database pertaining to the user.

FIG. 18 shows a version of the ninth embodiment of the invention that records the user's identified use information in an individual user database (9) connected to a non-fungible token (10). Here, the movement sensor (22) on the gripping apparatus is connected to a transmitter (13). The gripping apparatus has a serial number, a type of unique identifier. The movement sensor sends identified use information to the transmitter (13), which broadcasts the identified use information. The identified use information is then transmitted over the internet to the central program (24). The central program (24) saves the identified use information pertaining to the user in an individual user database (9). The central program (24) has interacted with a blockchain and caused the minting of a non-fungible token (10) that provides access to the individual user database pertaining to the user.

Figure 19:
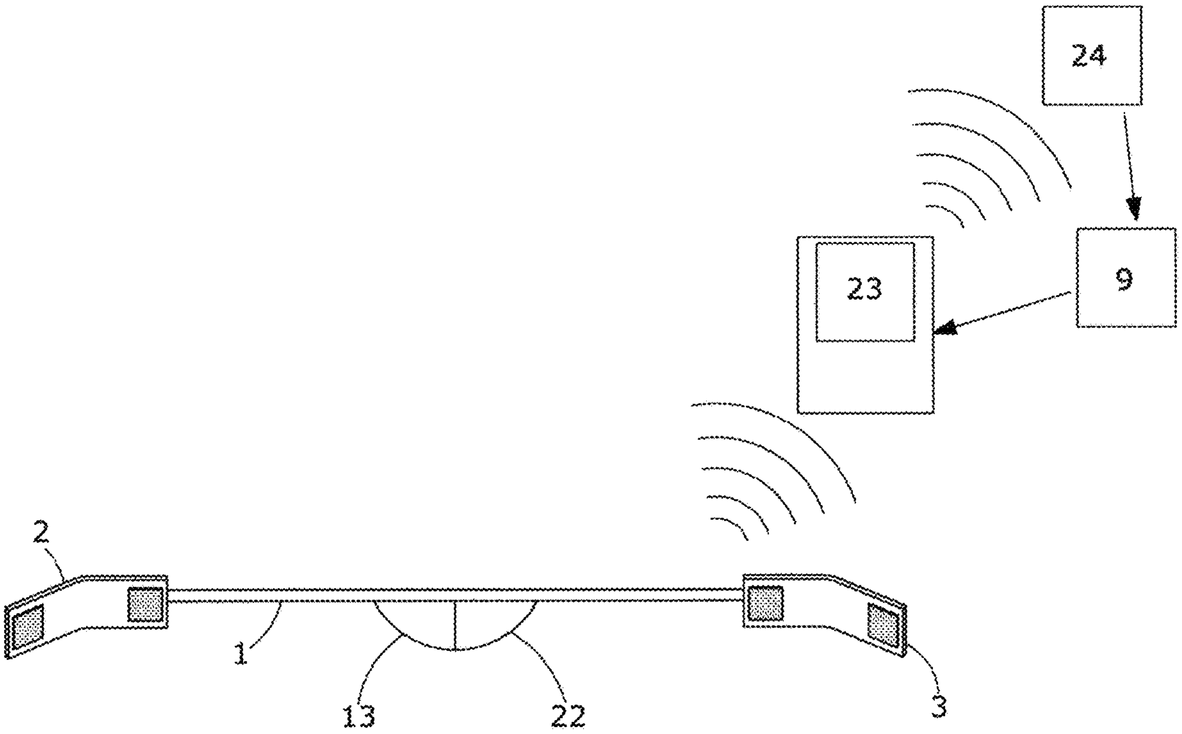
FIG. 19 shows a version of the tenth embodiment of the invention that uses a mobile program (23) and an individual user database (9). The first gripper (2) and second gripper (3) are connected to a central beam (1). Also attached to the central beam are a movement sensor (22) and a transmitter (13). The movement sensor sends information about the gripping apparatus's movement to the transmitter (13), which broadcasts this information, and the information is transmitted using the internet to receiving stations elsewhere. The information is then entered into the individual user database (9) for that user. The individual user database (9) is accessible to the user, using the mobile program (23).

FIG. 19 shows a version of the tenth embodiment of the invention that uses a mobile program (23) and an individual user database (9). The first gripper (2) and second gripper (3) are connected to a central beam (1). Also attached to the central beam are a movement sensor (22) and a transmitter (13). The movement sensor sends information, identified use information, in this case, about the gripping apparatus's movement, to the transmitter (13), which broadcasts the identified use information. The mobile program (23) receives this identified use information and re-broadcasts the identified use information to receiving stations elsewhere using the internet. The Central Program (24) receives the identified use information using the internet and enters the identified use information into the individual user database (9) for that user. The individual user database (9) is accessible to the user, using the mobile program (23). The user can observe how much the user has used the gripping apparatus by examining the individual user database (9) using the mobile program (23).

FIG. 20 shows an embodiment of the invention where the gripping apparatus includes a hard first gripper (4), and hard second gripper (5), both attached to a central beam (1). The gripping apparatus includes a subsidiary first gripper (7) and subsidiary second gripper (8) connected to a subsidiary beam (18) which is connected to a vertical beam (21), which is in turn connected to the central beam (1). The subsidiary first gripper (7) and subsidiary second gripper (8) also include electromagnets (15) and Velcro. The gripping apparatus includes a battery (12) that provides power to the electromagnets, movement sensor, transmitter, receiver, and the hard first gripper and hard second gripper. The hard first gripper and hard second gripper can open and close using this power, and the poles of the electromagnets in the subsidiary first gripper (7) and subsidiary second gripper (8) can be made to attract oppositely charged poles of other electromagnets using this power. The gripping apparatus also includes a movement sensor (22) attached to the central beam and operatively connected to the hard first gripper (4), hard second gripper (5), subsidiary first gripper (7) and subsidiary second gripper (8). A transmitter (13) is operatively connected to the movement sensor (22). A receiver (17) is operatively connected to the hard first gripper (4), hard second gripper (5), subsidiary first gripper (7) and subsidiary second gripper (8).

The user has a computing device, on which the mobile program (23) is installed. The user can use the mobile program (23) to communicate with the receiver (16) on the gripping device, and send commands to the receiver (16) on the gripping apparatus, commanding any of the hard first gripper (4), hard second gripper (5), subsidiary first gripper (7) or subsidiary second gripper (8) to open or close.

The movement sensor (22) sends identified use information to the transmitter (13), stating when the gripping apparatus moves, including when each of the hard first gripper (4), hard second gripper (5), subsidiary first gripper (7) and subsidiary second gripper (8) opens or closes. The transmitter (13) broadcasts this identified use information.

The identified user information is sent over the internet until it reaches the central program (24), and the central program (24) then integrates the identified user information into the individual user database (9) and the combined patient database (19). The central program (24) also has interacted with a blockchain and caused the minting of a non-fungible token (10) that gives access to the individual user database (9) of the user.

The user, in this version, can view the individual user database (9) of the user with the mobile program (23), and is accessible to the user's mobile program (23) over the internet.

FIG. 21 shows an embodiment of the invention with an intravenous pole permanently connected to a walker.

FIG. 22 is a flow chart of the flow of information in one embodiment of the invention, with a gripping apparatus that has a transmitter (13) and a movement sensor (22). A user uses the gripping apparatus. The movement sensor (22) records identified use information based on the movements of the gripping apparatus, and the opening and closing of the grippers, and the transmitter (13) broadcasts this identified use information. This identified use information is sent over the internet to the central program (24). The central program (24) integrates this identified use information into the individual user database (9), and the combined patient database (19). The central program also interacts with a blockchain so that a non-fungible token (10) giving access to the individual user database (9) is minted.

FIG. 23 is a version of the first embodiment of the invention where the first gripper (2) and second gripper (3) are each connected to the central rod (1) at one point.

FIG. 24 is a version of the first embodiment of the invention with a central rod (1) of variable length. The two subsections of the central rod, and the stiffening component, can be seen. The user can loosen the stiffening component by loosening a bolt, move the subcomponents relative to each other, and then tighten the bolt on the stiffening component so that it forces the subsections to stay in one place. The first gripper (2) and second gripper (2) are attached to subsections of the central rod (1).

FIG. 25 shows an embodiment of the invention with first Velcro patches with hooks next to first Velcro patches with loops on the first gripper (2) and second gripper (3). Corresponding second Velcro patches with loops can be seen next to corresponding Velcro patches with hooks on other parts of the first gripper (2) and second gripper (3), respectively.

FIG. 26 shows an embodiment of the invention with more than two Velcro patches on the outer side (26) and inner side (27) of the first gripper and outer side (26) and inner side (27) of the second gripper.

FIG. 27 shows a top-down view of an embodiment of the invention with Velcro patches on the outer side (26) of the first gripper and second gripper.

FIG. 28 shows a version of an embodiment of a gripping apparatus with a movement indicator (28). The movement indicator is connected to a movement sensor (22). The movement sensor senses movement of the gripping apparatus, and senses when the first gripper (2) and second gripper (3) open and close. The movement sensor sends this use information to the movement indicator (28), which displays an indication of the movement the gripping apparatus has made during a certain time period.

FIG. 29 shows a version of an embodiment of a gripping apparatus where each gripper includes multiple Velcro patches containing hooks and multiple Velcro patches containing loops. A user can pick which of the Velcro patches containing hooks the user wishes to attach to each of the looped patches, or decide to not attach some hooked patches to looped patches and/or to not attach some looped patches to hooked patches.

FIG. 30 shows a version of an embodiment of a gripping apparatus where each gripper includes Velcro patches with hooks and Velcro patches with loops next to each other.

FIG. 31 shows a version of an embodiment of a gripping apparatus where parts of each gripper interlock with each other. The grippers are open, so the viewer can see how the parts of each gripper can interlock with the other parts of that gripper. The user can press onto one of these parts of a gripper to cause the parts of that gripper to interlock. The user can also move one of the parts of a gripper to cause those parts to stop interlocking.

FIG. 32 shows a version of an embodiment of a gripping apparatus with two hard grippers, a first hard gripper (4) and a second hard gripper (5). The hard grippers are shown as open. In this version of the embodiment of the gripping apparatus, a screw-like component on the top of the first side of each hard gripper can be used to thread through a hole on the second side of that hard gripper, which goes through the second side. The screw-like component can go through the hole and poke through the bottom of the second side of that hard gripper. Likewise, a screw-like component on the bottom of the first of each hard gripper can be used to thread through the hole on the bottom of the second side of that hard gripper, and poke all the way through to the top of the second side of the hard gripper. This also helps the first hard gripper (4) and second hard gripper (5) to stay closed when the user desires.

Both hard grippers also include Velcro patches on their insides; each hard gripper (4) and (5) includes at least one Velcro patch with hooks, and a second, corresponding Velcro patch with loops.

Each Velcro patch on the inside of the first hard gripper (4) is supposed to stick to at least one other Velcro patch on the inside of the first hard gripper (4) when the first hard gripper (4) is closed. Each Velcro patch on the inside of the second hard gripper (5) is supposed to stick to at least one other Velcro patch on the inside of the second hard gripper (5) when the second hard gripper (5) is closed. This helps the first hard gripper (4) and second hard gripper (5) to stay closed when the user desires.

Both hard grippers also include soft inner portions surrounded by hard outer portions.

FIG. 33 shows a version of an embodiment of the remote control with a remote control gripper (29) and a suction cup (30). The user can use the remote control gripper or suction cup to attach the remote control to a location such as a wall, or a part of a bed, so that the user can easy access the remote control later.

FIG. 34 shows a diagram of a version of the mobile program (31), and how this version of the mobile program (31) makes information available to the user. The movement indicator module makes available to the user identified use information that it receives from a transmitter on a nearby gripping apparatus. The mobile program also connects to the individual database (9) and displays the individual database (9) for the user to that user.

FIG. 35 shows flows of information when a version of an embodiment of a gripping apparatus interacts with a version of the mobile program, and a version of the central program.

The gripping apparatus has a unique ID. The motion sensor (22) in the gripping apparatus sends identified use data to the movement indicator (28). The motion sensor (22) in the gripping apparatus separately sends identified use information about the movements of the gripping apparatus to the transmitter (13) and the transmitter broadcasts the identified use information. The mobile program (23) receives the broadcast identified use information using the computing device's wireless capabilities. The movement indicator in the mobile program displays the identified use information.

The central program (24) receives the broadcasted identified use information and saves the identified use information pertaining to the user in the individual user database (9). The individual user database (9) will be viewable by the user, using the mobile program (23).

The central program (24) also saves all the identified use information that it directly or indirectly has received from gripping apparatuses in the combined patient database (19). The Central Program (24) saves the identified use information that it has directly or indirectly received from each individual gripping apparatus to an individual gripping apparatus database (25), and saves all the use information that it receives from gripping apparatuses in the combined gripping apparatus database (31).

FIG. 36 shows a version of an embodiment of a gripping apparatus with an exceptionally large first gripper (2) and second gripper (3) and a central beam (1).

The invention claimed is:

1. An apparatus for holding two or more pieces of equipment at the same time, said apparatus comprising a central beam, and at least two gripping components attached to said central beam, where each said gripping component is capable of surrounding, gripping, and holding a piece of equipment, and each said gripping component is capable of releasing said piece of equipment, and each said gripping component is capable of releasing said piece of equipment when desired by a user, said apparatus further comprising that each gripping component is comprised of a flexible material, said apparatus further comprising that each gripping component comprised of a flexible material includes an inner side and an outer side, where the outer side connects to the central beam, and said apparatus further comprising that each gripping component comprised of a flexible material also includes at least one first part that, when placed in contact with a second part of said gripping component comprised of a flexible material, attaches to said second part of said gripping component comprised of a flexible material;

said apparatus further comprising that said first part of said gripping component comprised of a flexible material comprises a hook-and-loop fastener, and said second part of said gripping component comprised of a flexible material also comprises a hook-and-loop fastener;

said apparatus further comprising that the hook-and-loop fastener included in said first part of said gripping component comprises two or more or more patches of said hook-and-loop fastener, wherein one or more of said patches of said hook-and-loop fastener comprise hooks, and one or more other of said patches of said hook-and-loop fastener comprise loops;

said apparatus further comprising that said second part of said gripping component comprised of a flexible material includes patches of said hook-and-loop fastener with a number equal to the number of patches of said hook-and-loop fastener on the first part of said gripping component;

wherein, each patch of said hook-and-loop fastener on said second part of said gripping component, comprising hooks, is the same size and shape as a patch of said hook-and-loop fastener on the first part of said gripping component comprising loops;

wherein, each patch of said hook-and-loop fastener on said second part of said gripping component, comprising loops, is the same size and shape as a patch of said hook-and-loop fastener on the first part of said gripping component comprising hooks;

wherein each said patch of said hook-and-loop fastener, containing hooks, on the second part of said gripping component is located the same distance from the center of said central beam as a patch on the first part of said gripping component containing loops;

wherein each said patch of said hook-and-loop fastener, containing loops, on the second part of said gripping component is located the same distance from the center of said central beam as a patch on the first part of said gripping component containing hooks;

wherein the distance between each said patch of said hook-and-loop fastener, containing loops, on the second part of said gripping component, and each edge of the second part of said gripping component, is the same as the distance between one of said patches of said hook-and-loop fastener, containing hooks, on the first part of said gripping component and each edge of the first part of said gripping component;

and wherein the distance between each said patch of said hook-and-loop fastener, containing hooks, on the second part of said gripping component, and each edge of the second part of said gripping component, is the same as the distance between one of said patches of said hook-and-loop fastener, containing loops, on the first part of said gripping component and each edge of the first part of said gripping component.

2. The apparatus of claim 1, further comprising that the central beam is constructed in a manner to allow a user to change the central beam's length, if desired by the user.

3. The apparatus of claim 1, further comprising that the central beam includes at least two sections, and at least one means for fixing the position of said sections relative to each other, where said means for fixing the position of said sections relative to each other can be manipulated by the user to allow said sections to move relative to each other, or to hold said sections in a fixed position relative to the other sections.

4. The apparatus of claim 1, further comprising that at least one gripper includes at least one patch of said hook-and-loop fastener containing hooks and at least one patch of said hook-and-loop fastener containing loops on the inner side of said gripper, and at least one patch of said hook-and-loop fastener containing hooks and at least patch of said one hook-and-loop patch containing loops on the outer side of said gripper.

5. The apparatus of claim 1, further comprising that the hook-and-loop fastener included in said first part of said gripping component comprised of a flexible material is Velcro and the hook-and-loop fastener included in said second part of said gripping component comprised of a flexible material is Velcro.

6. The apparatus of claim 1, said apparatus further comprising one or more of the following;

a. one or more cross-beams, attached to the central beam, and also a gripping component attached to at least one end of each said cross-beam, wherein each said gripping component is capable of surrounding, gripping, and holding a piece of equipment, wherein each said gripping component is capable of releasing said piece of equipment when desired by a user;

b. one or more subsidiary beams, with a gripping component that is capable of surrounding, gripping, and holding a piece of equipment, wherein each said gripping component is capable of releasing said piece of equipment when desired by a user;

c. one or more vertical beams (21), attached to the central beam, with one or more subsidiary beams attached to each said vertical beam (21), and also a gripping component that is capable of surrounding, gripping, and holding a piece of equipment, wherein each said gripping component attached to at least one end of each said subsidiary beam (18) is capable of releasing said piece of equipment when desired by a user.

7. The apparatus of claim 6, said apparatus further comprising that at least one gripping component attached to one of said cross-beams, vertical beams or subsidiary beams is one of the following;

a. a gripping component including manual hooks and manual loops, wherein a user can help this gripping component to stay closed by placing each of said manual hooks inside a manual loop;

b. adhesives on the inner side of this gripping component, wherein a user can cause said adhesives to contact another part of said gripping component, causing said gripping component to stay closed, when desired by said user;

c. a piece of one part of this gripping component that can be inserted into another part of said gripping component, causing this gripping component to remain closed while said part of this gripping component is inside the other part of this gripping component;

d. one part of this gripping component that can interlock with another part of this gripping component, causing this gripper to remain closed, when a user desires;

e. buttons on one part of this gripping component that can attach to attachment points for said buttons on another part of this gripping component;

f. the first part of the gripping component includes one or more magnets, and the second part of the gripping component can contact an oppositely charged pole in one of the magnets in the first part of the gripping component when the second part of the gripping component contacts the first part of the gripping component.

8. The apparatus of claim 1, said apparatus further comprising that a remote control (11) which is not physically connected to any of said gripping components or to said central beam, and which is capable of sending wireless signals, and said apparatus further comprising a receiver (16), which is capable of receiving wireless signals from said remote control, and said apparatus further comprising that said receiver is operatively connected to a means for connecting a patch on a gripper of said hook-and-loop fastener containing hooks to a patch on the said gripper of said hook-and-loop fastener containing loops, and is capable of sending a signal to said means for opening and closing one or more of said gripping components;

so that said means for connecting a patch on a gripper of said hook-and-loop fastener containing hooks to a patch on the said gripper of said hook-and-loop fastener containing loops can either attach or detach said patch of said hook-and-loop fastener containing hooks from said patch of said hook-and-loop fastener containing loops when said receiver receives a wireless signal from said remote control commanding that said patch of said hook-and-loop fastener containing hooks be attached or detached, respectively, from said patch of said hook-and-loop fastener containing loops.

9. The apparatus of claim 1, said apparatus further comprising a means for attachment, wherein said means for attachment is placed on said central beam, and a user can use said means of attachment to temporarily attach said central beam to other objects, and said user can also detach said means of attachment and central beam from these other objects.

10. An apparatus for holding two or more pieces of equipment at the same time, said apparatus comprising a central beam, and at least two gripping components attached to said central beam, where each said gripping component is capable of surrounding, gripping, and holding a piece of equipment, and each said gripping component is capable of releasing said piece of equipment when desired by a user;

said apparatus further comprising that each gripping component is comprised of a flexible material;

said apparatus, further comprising that each gripping component comprised of a flexible material includes an inner side and an outer side, where the outer side connects to the central beam;

and said apparatus further comprising that each gripping component comprised of a flexible material also includes at least one first part that, when placed in contact with a second part of said gripping component comprised of a flexible material, attaches to said second part of said gripping component comprised of a flexible material;

said apparatus further comprising that said first part of said gripping component includes one or more magnets, and said second part of said gripping component can contact an oppositely charged pole in one of the magnets in the first part of said gripping component when said second part of said gripping component contacts said first part of said gripping component.

11. The apparatus of claim 10, said apparatus further comprising that said magnets are electromagnets, and said apparatus includes a battery, which provides power to said electromagnets and is operatively connected to said electromagnets.

12. The apparatus of claim 10, said apparatus further comprising a remote control (11) which is not physically connected to any of said gripping components or to said central beam, and which is capable of sending wireless signals, and said apparatus further comprising a receiver (16), which is capable of receiving wireless signals from said remote control, and said apparatus further comprising that said receiver is operatively connected to a means for opening and closing one or more of said gripping components, and is capable of sending a signal to said means for opening and closing one or more of said gripping components;

so that said means for opening and closing one or more of said gripping components can either open or close at least one of said gripping components when said receiver receives a wireless signal from said remote control.

13. The apparatus of claim 12, said apparatus further comprising one or more of the following;

a. a means for attachment, wherein said means for attachment is placed on said central beam, and a user can use said means of attachment to temporarily attach said central beam to other objects, and said user can also detach said means of attachment and central beam from these other objects;

b. a means for attachment, wherein said means for attachment is placed on said remote control, and a user can use said means of attachment to temporarily attach said central beam to other objects, and said user can also detach said means of attachment and central beam from these other objects.

14. An apparatus for holding two or more pieces of equipment at the same time, said apparatus comprising a central beam, and at least two gripping components attached to said central beam, where each said gripping component is capable of surrounding, gripping, and holding a piece of equipment, and each said gripping component is capable of releasing said piece of equipment when desired by a user;

said apparatus further comprising that at least one gripping component is comprised of a hard material, and is capable of surrounding, gripping, and holding a piece of equipment said apparatus further comprising that each gripping component comprised of a hard material includes at least one first part that, when placed in contact with a second part of said gripping component comprised of a hard material, attaches to said second part of said gripping component comprised of a hard material;

said apparatus further comprising that the method by which the first part of each gripping component comprised of a hard material attaches to said second part of said gripping component comprised of a hard material is through a patch of a hook-and-loop fastener located on the first part of each gripping component comprised of a hard material which attaches to a patch of the same hook-and-loop fastener located on the second part of that gripping component, when placed in contact with the patch of the same hook-and-loop fastener located on the second part of that gripping component.

15. The apparatus of claim 14, said apparatus further comprising that at least one of said gripping components comprised of a hard material comprises one or more of the following;

a. manual hooks and manual loops, wherein a user can help this gripping component to stay closed by placing each of said manual hooks inside a manual loop;

b. adhesives on the inner side of this gripping component, wherein a user can cause said adhesives to contact another part of said gripping component, causing said gripping component to stay closed, when desired by said user;

c. one part of this gripping component can be inserted into another part of this gripping component, causing this gripping component to remain closed while said part of this gripping component is inside said other part of said gripping component;

d. one part of this gripping component can interlock with another part of this gripping component, causing this gripping component to remain closed, when a user desires;

e. buttons on one part of this gripping component that can attach to attachment points for said buttons on another part of this gripping component;

f. said first part of this gripping component includes one or more magnets, and said second part of this gripping component can contact an oppositely charged pole in one of the magnets in the first part of this gripping component when said second part of this gripping component contacts said first part of said gripping component;

g. said first part of said gripping component comprised of a hard material has an indented portion where the interior of the indented portion has a flexible covering, and said second part of said gripping component also includes an indented portion where the interior of the indented portion of the second part of said gripping component with comprised of a hard material has a flexible covering, and, when said first part of said gripping component comprised of a hard material is attached to said second part of said gripping component comprised of a hard material, the space formed by the indent in the first part of said gripping component comprised of a hard material and the indent in the second part of said gripping component comprised of a hard material forms a passage in which part of one of said pieces of equipment can fit.

16. A method of allowing a user to move one or more pieces of equipment, while also moving another piece of equipment, said method comprising the steps of;

providing an apparatus comprising a central beam, and at least two gripping components attached to said central beam, where each said gripping component is capable of surrounding, gripping, and holding a piece of equipment, and each said gripping component is capable of releasing said piece of equipment when desired by the user;

using one of the gripping components to surround, grip, and hold a piece of equipment;

using another of the gripping components to surround, grip, and hold another piece of equipment;

causing the user to move one of the pieces of equipment, thus causing the other piece of equipment to move, said method further comprising the step of providing a motion sensor, which is operatively connected to at least one of the gripping components and which is capable of sensing movement, including opening or closing, of any of the gripping components to which said motion sensor is connected, the step of providing a transmitter, operatively connected to the motion sensor, operatively connected to at least one of the gripping components, where said motion sensor sends information about movement, including opening or closing, of any of the gripping components to which said motion sensor is connected, to the transmitter, the step that said transmitter broadcasts information about the movement of said gripping components, the step that said information about the movement of said gripping components is transmitted over the internet, to a central program, the step that said central program places said information about the movement of said gripping components in one or more databases, said method further comprising the step of the central program interacting with a blockchain to mint a non-fungible token, and the step of making one or more of said databases only accessible to the entity holding said non-fungible token.

17. The method of claim 16, said method further comprising the step providing that each individual gripping apparatus has a unique identifier;

the step of providing that each individual patient using any said gripping apparatus has a unique identifier;

the step of providing that each individual patient using any said gripping apparatus can associate that individual patient's unique identifier with the unique identifier of any individual gripping apparatus that patient uses, and can dissociate that individual patient's unique identifier with the unique identifier of any individual gripping apparatus that patient uses;

the step of providing that said databases include an individual patient database;

and the step that a copy of any use data created by any individual gripping apparatus with a unique identifier that is associated with the unique identifier of an individual patient will be placed in an individual database for that individual patient.

18. The method of claim 16, said method further comprising the step of providing that each individual gripping apparatus has a unique identifier;

the step of providing that said databases include an individual gripping apparatus database;

and the step that a copy of any use data created by any individual gripping apparatus will be placed in an individual gripping apparatus database for that individual gripping apparatus.

19. The method of claim 16, said method further comprising the step of providing that each individual gripping apparatus has a unique identifier;

the step of providing that said databases include a combined gripping apparatus database, and the step that a copy of any use data created by any individual gripping apparatus will be placed in a combined gripping apparatus database.

20. A system for helping patients to move multiple pieces of equipment at the same time, while monitoring how often, and when, the patients move equipment, said system comprising a central beam and at least two gripping components attached to said central beam, where each said gripping component is capable of surrounding, gripping, and holding a piece of equipment, and each said gripping component is capable of releasing said piece of equipment when desired by a user, said system further comprising a movement sensor attached to said central beam, a transmitter, operatively connected to the movement sensor, that is operatively connected to at least one of the gripping components, where said movement sensor sends information about movement, including opening or closing, of any of the gripping components to which said movement sensor is operatively connected, to the transmitter, wherein said transmitter broadcasts information about the movement of said gripping components, so that said information about the movement of said gripping components is sent over the internet, to a central program, which places said information about the movement of said gripping components in one or more databases;

said system further comprising that said central program is capable of interacting with a blockchain to mint at least one non-fungible token;

said system further comprising that each of said databases may be accessed only by the entity holding one of said non-fungible tokens.

* * * * *